United States Patent [19]
George

[11] Patent Number: 5,267,181
[45] Date of Patent: Nov. 30, 1993

[54] CYBERNETIC INTERFACE FOR A COMPUTER THAT USES A HAND HELD CHORD KEYBOARD

[75] Inventor: Christopher S. George, Mount Sanai, N.Y.

[73] Assignee: Handykey Corporation, Mt. Sinai, N.Y.

[21] Appl. No.: 431,611

[22] Filed: Nov. 3, 1989

[51] Int. Cl.⁵ ............................................. G06F 3/02
[52] U.S. Cl. ..................... 364/709.12; 364/709.15; 364/708.1
[58] Field of Search ..................... 364/709.15, 709.12, 364/708, 705.03

[56] References Cited

U.S. PATENT DOCUMENTS

| | | | |
|---|---|---|---|
| 3,022,878 | 2/1962 | Seibel et al. | 197/19 |
| 3,428,747 | 2/1969 | Alferieff | 178/17 |
| 3,937,939 | 2/1976 | Frenkel | 364/705.03 |
| 3,967,273 | 6/1976 | Knowlton | 340/365 S |
| 4,042,777 | 8/1977 | Bequaert et al. | 179/79 |
| 4,065,650 | 12/1977 | Lou | 200/5 R |
| 4,107,642 | 8/1978 | Crummett | 338/128 |
| 4,313,227 | 1/1982 | Eder | 455/617 |
| 4,344,069 | 8/1982 | Prame | 340/365 S |
| 4,360,892 | 11/1982 | Endfield | 364/900 |
| 4,369,439 | 1/1983 | Broos | 340/710 |
| 4,414,537 | 11/1983 | Grimes | 340/365 R |
| 4,415,065 | 11/1983 | Sandstedt | 186/39 |
| 4,425,488 | 1/1984 | Moskin et al. | 200/220 |
| 4,442,506 | 4/1984 | Endfield | 364/900 |
| 4,443,789 | 4/1984 | Endfield et al. | 340/365 R |
| 4,450,325 | 5/1984 | Luque | 200/52 R |
| 4,490,056 | 12/1984 | Whitaker | 400/100 |
| 4,503,299 | 3/1985 | Henrard et al. | 200/61.52 |
| 4,516,939 | 5/1985 | Crimmins, Jr. | 434/114 |
| 4,517,424 | 5/1985 | Kroczynski | 200/52 R |
| 4,549,279 | 10/1985 | Lapeyre | 364/709.15 |
| 4,555,193 | 11/1985 | Stone | 400/486 |
| 4,578,674 | 3/1986 | Baker et al. | 340/710 |
| 4,584,443 | 4/1986 | Yaeger | 200/6 A |
| 4,587,520 | 5/1986 | Astle | 340/710 |
| 4,638,306 | 1/1987 | Rollhaus et al. | 340/365 R |
| 4,654,648 | 3/1987 | Herrington et al. | 340/710 |
| 4,679,030 | 7/1987 | Volnak | 340/365 R |
| 4,680,572 | 7/1987 | Meguire et al. | 340/365 R |
| 4,694,280 | 9/1987 | Rollhaus et al. | 340/365 R |
| 4,727,478 | 2/1988 | Endfield et al. | 364/200 |
| 4,758,691 | 7/1988 | De Bruyne | 178/19 |
| 4,775,255 | 10/1988 | Langley | 400/485 |
| 4,787,051 | 11/1988 | Olson | 340/710 |
| 4,791,408 | 12/1988 | Heusinkveld | 340/365 R |
| 4,846,598 | 7/1989 | Livits | 400/472 |
| 4,847,799 | 7/1989 | Morita et al. | 364/709.12 |
| 4,849,732 | 7/1989 | Dolenc | 341/20 |
| 4,891,777 | 1/1990 | Lapayre | 364/709.15 |
| 4,953,113 | 8/1990 | Chadima, Jr. et al. | 364/708 |

OTHER PUBLICATIONS

"OCTIMA chord keyboard", Ergoplic Keyboards (brochure).
Bequaert, "Typamatic Feature for Chord Keyboard", IBM Technical Disclosure Bulletin, vol. 22, No. 12, May, 1980, pp. 5504-5505.
"Typing With a Two-Hand Chord Keyboard: Will the QWERTY Become Obsolete?", Daniel Gopher and David Raij, IEEE Transactions on Systems, Man, and Cybernetic, vol. 18, No. 4, Jul./Aug. 1988, pp. 601-609.

Primary Examiner—David H. Malzahn
Attorney, Agent, or Firm—Kenyon & Kenyon

[57] ABSTRACT

The cybernetic interface of the present invention contemplates a remote hand-held, data input unit which communicates as an input device to a computer. The data input unit has the following broad features; an ergonomically correct handle, a symmetrical design so that the handle may be operated by either the right or left hand of the user, a chord keyboard on the handle that is operated by the four fingers of a hand of a user, a shift keyboard that is operated by the thumb of the same hand of the user, an integral means for generating pointer control information, a strap or band to support the unit in the hand, and a communications means to communicate the input from the data input unit to the computer either by wired or wireless means.

71 Claims, 7 Drawing Sheets

CYBERNETIC INTERFACE FOR A COMPUTER THAT USES A HAND HELD CHORD KEYBOARD

BACKGROUND OF THE INVENTION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

The present invention relates generally to devices for entering data into a computer.

The most common way for a person to interact with a computer is through a keyboard. The standard computer keyboard is the QWERTY keyboard, first developed in the 19th century for use with mechanical typewriters. The QWERTY keyboard, sometimes known by its full name of QWERTYUIOP, has keys spread out in horizontal rows across the surface of the keyboard. Imprinting a character is achieved by depressing the corresponding key on the keyboard.

The QWERTY keyboard was designed to provide the maximum physical separation between the most frequently used letters of the alphabet, and thus reduce the likelihood of keys jamming during typing. The layout of keys that resulted is not particularly logical; the name of the keyboard is taken from the ordering of the first row of keys.

An alternate type of QWERTY keyboard is the Dvorak keyboard. The Dvorak keyboard has the most frequently used keys placed where they are most accessible to the typist. This arrangement is well known for allowing typists to attain greater efficiency and faster typing speeds relative to the old QWERTY keyboard.

The QWERTY keyboard, nevertheless, remains the standard keyboard despite the greater efficiencies of the Dvorak keyboard. One impediment to adopting the Dvorak keyboard is its similarity with the QWERTY keyboard; a typist who is skilled at typing on either a QWERTY or a Dvorak keyboard can type only with difficulty on the other. This problem of incompatibility appears to happen because both the Dvorak and QWERTY keyboards are mere variations of the same basic keyboard. It follows that the same motor centers of the brain needed to type on a QWERTY keyboard are also needed to type on a Dvorak keyboard. The finger motions needed to type on either keyboard are similar. This similarity causes the human mind to have trouble keeping the motor control needed to type on either one of the keyboards separate. Using both keyboards skillfully requires too much of a typist because the typing skills interfere. It is common knowledge that a typist can transfer between the QWERTY and Dvorak keyboards only with great difficulty.

The skill required to type on both the QWERTY and Dvorak keyboards is difficult to learn and easy to forget. A person must practice for hundreds of hours to become proficient in typing on either the Dvorak or QWERTY keyboard. These difficulties result from the extreme complexity of motion required to type efficiently; the typist must learn and retain the trajectory between each key and every other key on the keyboard covered by a given finger. This rote learning is quickly forgotten if not practiced regularly.

Special characters compound the complexity of typing on a QWERTY or Dvorak keyboard. A typist often must type characters other than alphanumeric characters—mathematical, cyrillic, and oriental symbols and characters are common examples. Customizing a conventional keyboard to accommodate these additional symbols is easy to do using additional shift keys such as the "control" and "alternate" keys. These additional shift keys, however, create whole new levels of complexity for typing. A typist must learn how to move efficiently between the keys having these new characters. As a result, learning these new keystrokes is as complex as learning how to type the alphanumeric characters. Moreover, there is no standard by which to add these additional characters to a computer keyboard. Each computer maker and, indeed, every software maker can assign different characters to the "alternate" and "control" shift keys. The conventional keyboard thus reduces even a skilled typist to using a "hunt and peck" method of data entry as a mattter of necessity—the number of times that special characters need to be typed do not permit anyone to learn and retain the knowledge needed to type them efficiently.

Another disadvantage associated with the conventional, QWERTY-type keyboard is the increase in the number of inexperienced typists who are using keyboards as a result of office automation. The proliferation of personal computers, hand calculators and other forms of automated office equipment have required that virtually everyone enter data into a computer through a keyboard. However, very few individuals have the time to become proficient typists. Hence, most typing involves the "hunt and peck" and "hunt and check" methods, defined herein as selecting one key at a time based on some template overlay. This form of data entry is inefficient and frustrates the ability of office automation to increase productivity.

Yet another liability of the conventional QWERTY-type keyboard is its size. The conventional keyboard requires a certain minimum surface area in which to spread out the keys since each key must have a certain minimum size to be touched.

The size of the QWERTY keyboard is now a concern. The minimum size of a computer has been decreasing for some time. One limit that was reached in the personal computer was the size required for a video display tube (VDT)—the last vacuum tube commonly used in consumer electronics. Recent advances in solid state displays, however, eliminate the necessity of using a VDT for the display screen. Microprocessor and microelectronic technology, together with solid state video display technology, allow computers that are quite small to be produced—a personal computer can fit in a package no larger than a small book, rather than the several cubic feet that is now so common. It is the keyboard—that anachronism from the 19th century—that now sets the lower limit of the practical size of a personal computer.

There is another type of keyboard for entering data into a computer—the chord keyboard. In contrast to the QWERTY and Dvorak keyboards, the chord keyboard does not require a typist to memorize a large number of finger trajectories to enter data. The chord keyboard has a small number of keys, usually between five and twenty-five. In addition to generating characters by pressing a single key, a chord keyboard also generates a character when two or more keys are simultaneously depressed—in contrast to the conventional, QWERTY-type keyboard which was specifically designed to avoid a typist depressing multiple keys at the same time.

Chord keyboards have many desirable attributes that are well known in the art. For example, a typist can learn to "touch type" on a chord keyboard with 30-60 hours of practice. One reason for this shorter learning period is that the relatively small number of keys on a chord keyboard reduces the errors caused by fingers getting out of alignment the way they easily can on a QWERTY keyboard. Writing is something done by one hand; a chord keyboard also can be operated by one hand. Typing on a chord keyboard therefore can be more natural than typing on a conventional, QWERTY-type keyboard. There is no need for the typist to memorize many complex finger trajectories in order to use a chord keyboard.

Another known advantage of a chord keyboard is its compatibility with the QWERTY and Dvorak keyboards. The type of motor control needed to type on a chord keyboard compared to that needed to type on a conventional, QWERTY-type keyboard is such that a typist apparently experiences little or no difficulty in changing back and forth between them. It should therefore be possible for the chord keyboard to coexist with the QWERTY keyboard.

The chord keyboard has another attribute that makes it particularly important now—chord keyboards are smaller in size. The layout for 5-25 keys requires substantially less surface area than that needed to layout the 30-100+ keys found on typewriters, personal computers and word processors. Moreover, customizing a chord keyboard involves the relatively simple process of assigning new characters to previously unused combinations of keys or adding additional shift keys. Learning to touch type these new key arrangements is also less time consuming than on a conventional QWERTY-type keyboard. The chord keyboard has great promise for reducing the size of the lap top computer and for increasing productivity and typing speed.

There are problems, however, in realizing the promise of the chord keyboard. The art contains many examples of chord keyboards, but none have succeeded in unlocking the enormous potential inherent in the basic concept of the chord keyboard.

One disadvantage of the chord keyboard is that a typist must be assisted to find the keys on the keyboard. A chord keyboard can leave the typist without any way to know which combination of keys will generate a particular character. In contrast, the QWERTY keyboard displays all the characters all the time; the typist is invited to find characters and to press the character keys on the keyboard. A chord keyboard is to a conventional, QWERTY keyboard as a command driven software program is to a menu driven program; a command driven program does not tell the user which commands are available, whereas a menu driven program does by displaying commands on a menu. The chord keyboard hides its characters, whereas a QWERTY keyboard always has them in full display. Hence, the QWERTY keyboard is more "user friendly" even though it is more difficult to use.

Another disadvantage of a chord keyboard is the extra work needed to generate each character. A conventional, QWERTY-type keyboard requires only one finger motion to generate a character. A chord keyboard, by definition, requires depressing several keys for at least some characters. This additional work can become tiring.

Another disadvantage of the chord keyboard is that it does not have an ergonomic design. Indeed, chord keyboard designs appear to have been made without ever considering the stress that they place on the typist. Previous chord keyboards can require the typist to engage in hand motions that are highly abnormal such as, for example, keeping the hand pressed flat against the keyboard or requiring the typist to generate a character by lifting the finger rather than by depressing it. The human hand is adapted to grabbing and pulling objects—not repeatedly moving fingers up and down across a flat keyboard surface or repeated flicking buttons to generate characters. The lack of an ergonomically correct design for a chord keyboard limits its acceptance and its utility.

A disadvantage shared by the conventional, QWERTY keyboard and previous chord keyboards is a matter of health called repetitive stress injury (RSI), a malady that has been traced directly to doing repetitive work in a way that the human body is not designed to do. RSI is a multi-faceted problem, but some of its elements related to using keyboards involve sitting at a console bound—or desk bound—keyboard with a relatively fixed position of the back, neck, arms, and fingers, for extended periods of time. The cure for RSI is to redesign the work to be more natural for the worker, i.e., to make the equipment more ergonomic so that the repeated activity does not stress the body. Chord keyboards in the prior art, had they been more utilized, would have been particularly prone to inflicting RSI on the typist due to the larger number of keystrokes required to enter the same data.

Another disadvantage shared by both the QWERTY keyboard and the chord keyboard is that neither have been integrated into the general cybernetic interface required for man-machine interaction. For example, a personal computer typically includes a separate mouse or other device to move the pointer on the display. The objective is to point at "icons" on the display which are then selected using a separate "click on" button. The "click and drag" feature used on the Apple Macintosh, Macintosh II and IBM PS2 personal computers make heavy use of the pointing device which are required by the graphical user interface. Neither machine, however, is equipped with a keyboard with an all purpose user control. As a result, a typist must inefficiently shift back and forth between the keyboard and the pointing device.

The disadvantages associated with the chord keyboard have prevented its acceptance where most needed—the commercial marketplace. Now, however, those disadvantages must be overcome so that personal computers can become fully portable. There is thus an urgent need in the art for a small, portable chord keyboard that is ergonomically designed to counter repetition stress injury as well as minimize the time needed to learn new keystrokes. It is further advantageous that the chord keyboard provide all the data input required by the computer in an ergonomically correct manner. Only then can the potential of the chord keyboard be realized in commercial practice.

The ergonomic disadvantages of prior chord keyboards may be summarized as:
1) Too few keys, resulting in too many fingers being used to generate each desired character; chord keyboard typing was therefore very tiring.
2) Too many finger press positions, requiring very fine motor control; errors were easily made.

3) No logical arrangement of characters so that chord typing was difficult to learn.
4) No visual cues indicating what keys to press to generate a given character.
5) Unnatural finger positions were required to type each character.

SUMMARY OF THE INVENTION

The present invention generally relates to a cybernetic interface for a computer that uses a remotely held chord keyboard to input data to a computer. The objective of the present invention is to enable the chord keyboard to be used as a small, ergonomically correct, completely portable manual data input unit, and to provide a completely portable cybernetic interface that allows a user to input data into the computer. The present invention facilitates entry of all types of information that a user needs to enter to interact with a computer in one, hand-held, transportable unit. Moreover, the interface is designed to facilitate rapid, repeated data entry by even inexperienced typists.

The cybernetic interface of the present invention contemplates a hand-held, manually operated data input unit coupled by a communications link to a computer, and preferably a display. The data input unit has the following broad features; an ergonomically correct handle, a symmetrical design for use by either the right or left hand of the user, a chord keyboard or keypad on the handle that is operated by the four fingers of the hand of the typist, a shift keyboard or keypad that is operated by the thumb of the same hand, an integral pointer positioning unit, and a strap or band that fits around the back of the hand that holds the unit in the palm without effort.

Generally, the data input unit of the interface uses a microprocessor to generate input data, specifically scan codes, sensor data and control codes. The communications link transmits this input data from the data input unit to the computer and the latter uses a look-up routine to assign characters to this data based upon the scan codes and/or other data. The display, when used, displays the symbols which correspond to the assigned characters. The communications link, computer and display, if used, may be contained in the data input unit so as to provide a completely integrated system. Alternately, the communications link and computer may be contained within the data input unit and the display kept separate from that unit but connected to it by a cable or other suitable transmission means.

In the case where the computer is separate from the data input unit, i.e., the basic configuration, the communications link may be a cable connected to the data input unit at one end and the input port of the computer at the other end. The communications link may also be a wireless link consisting of a modulator, transmitter, receiver and demodulator. In this configuration, the modulator and transmitter are located in the data input unit, and the receiver and demodulator comprise part of a separate base unit connected by a cable to an input port of the computer. If the computer is contained within the data input unit, the preferable communications link is a cable.

It should be noted that the data input unit uses a microprocessor to scan the chord keyboard and generate the scan codes. The computer interprets these scan codes received from the data input unit using a software look-up routine.

In a wireless communications link embodiment, the data input unit includes a communications unit to transmit the input data from the keyboard to the base unit. The base unit of a wireless embodiment receives the data from the data input unit and directs the input data from that unit to an input port of the computer.

The ergonomic design of the chord keyboard of the present invention features a handle which can be held in one hand and uses finger motions to generate characters which are the same as the finger motions required to clench a fist. The motion is entirely natural, and therefore should cause no stress to the typist as well as reduce the effort needed to type. The thumb can press a variety of shift keys on the top of the keyboard. The other fingers can press keys on the front face of the handle. A hand strap is attached to the data input unit to keep the keyboard mounted in the palm of the hand so that the typist does not have to exert any effort to hold on to it—while typing, thinking, talking or at any other time. Furthermore, the hand can relax completely when not entering data since the typist need exert no effort to hold the keyboard in the hand. Because it is geometrically symmetrical in the preferred embodiment, the handle is ambidextrous and the typist can easily switch the handle to the other hand when the first hand becomes tired.

In the present invention, the keyboard is preferably arranged on an ergonomically designed handle in three columns of four rows each, where keys can be operated by the four fingers of the typist. The keys are preferably arranged in a logical pattern that is easy to learn and to remember. For example, the keys "ABCD" and "EFGH" can be positioned along the right and middle columns and the keys "space", "backspace", "delete", and "enter" along the left column, respectively. The remaining common keys can be chorded with one of the three keys on the upper row under the first finger. This type of keyboard arrangement creates a simple way to remember the location of the most common keys and thus reduces the need for using the "hunt-and-peck" typing method. Also, with twelve finger keys, the most frequently used characters have only one or two keys involved.

A color coded template can overlay the keys to facilitate even easier identification. The present invention also contemplates a help menu that would display the character chords on the display screen of the computer. These features provide the chord keyboard of the present invention with the advantages of easier character identification usually found only in a conventional, QWERTY-type keyboard.

The shift keys can be positioned on the top of the keyboard for actuation by the thumb. The top of the keyboard can also include indicators such as a display to show, for example, characters transmitted from the computer, when the keyboard is operating and when the battery is low. The shift keys are arranged so that the thumb can depress more than one key at a time, if desired, and only if that is desired.

One embodiment of the invention contemplates controlling the pointer with a tilt sensor embedded inside the keyboard. The tilt sensor can be an electrolytic tilt sensor such as Model SP5000 manufactured by the Spectron Corporation of Hauppauge, N.Y. This dual axis device responds to the angle of inclination of the keyboard in two axes and as interpreted by the computer, such that the pointer on the screen is moved up, down, left and right by pressing the "mouse" button with the thumb and tipping the keyboard backward, forward, counter-clockwise and clockwise, respectively. The amount of movement of the pointer on the screen is proportional to the arc through which the device is moved. The electrical resistance among electrodes in the sensor changes with the angle from vertical as an electrolytic fluid moves in the sensor. These changes are read through an analog to digital converter by a microprocessor and sent to the computer which interprets these changes as pointer movements on the screen. The typist can press finger keys simultaneously with the "mouse" button to generate "mouse click", etc. commands. Alternately, a pair of angular accelerometers, two pairs of translational motion accelerometers, or a conventional rolling ball type sensor can be used in place of the tilt sensor to provide pointing information.

The commands generated by the keyboard, the shift keys and the integral pointer positioning unit can be communicated to the CPU of the computer through the communications unit. For example, the input data can be classified as a scan code of three bytes in response to the release of a key, as a control code of one byte in response to releasing the "mouse" key and as pointer position information of six bytes to indicate the desired pointer movement on the screen. The scan code indicates which keys in the data input unit have been pressed and released. The control code can instruct the CPU when to repeat a given character, although other types of information are possible. The tilt sensor can provide data that is interpreted by the CPU as pointer movement. The pointer motion can be constant in any given direction, although the motion can be made to accelerate either in response to the rapidity of movement of the data input unit (dynamic tracking) or by pressing additional finger keys. The tilt values are averaged over a given period of time to reduce the effect of slosh. A look up routine in the computer assigns ASCII character values and special functions such as "caps lock", "number lock", etc. to the three byte scan codes.

The communications unit can transmit the information over a cable or wire directly to an input port of the CPU or remotely using an appropriate remote wireless communications link, such as a radio frequency transmitter or any other acceptable type of communications link such as infrared and ultrasonic transmitters, many examples of which are well known.

The base unit receives the communications from the communications unit and provides the input port of the CPU of the computer with the appropriate data. The base unit can merely relay the codes received from the data input unit or it can execute its own look up routine to assign different codes to those received from the data input unit. It is contemplated that the base unit could appear to the CPU to be identical to the keyboard and mouse normally found at the user input. While not described specifically herein, the computer may also communicate information to the data input unit which would then be shown on an optional integral display on the data input unit. The base unit may also receive input data from more than one unit. For example, two handed typing using two data input units is consistent with the teachings of the present invention. In the wired embodiment, a separate base unit for each data input is not needed since the wire can connect the unit directly to one of several available computer ports.

The present invention is foreseen as having particular utility for portable, "lap top" personal computers. These computers are expected to benefit the most from the smaller keyboard obtainable using the present invention because the minimum size of the computer is no longer limited by the keyboard—the present invention is designed to fit comfortably into one hand, and have the functionality of a full keyboard and mouse.

The present invention should also be advantageous for typists using other types of computers. Learning new key strokes should be easier and more rapid, especially for special symbols, different alphabets, customized keyboards and the like. With the integral pointing device of the invention, there is no longer the need to continuously switch back and forth from mouse to keyboard. Indeed, the character look up routine used by the computer facilitates easy customization of the present invention. Using a remote transmitter should allow a typist to compose a document while pacing around the room. With an effective addressing range of the chord keyboard of over 4,000 keys (through combinations), unused combinations can be assigned to many different things such as telephone control, TV and stereo remote control, word and phrase generation, music playing through a MIDI interface, and general remote control operation.

The present invention is advantageous for handicapped individuals, for example, those having the use of only one hand. The present invention also has particular advantage for the voice impaired. The present invention provides for forming over 4,000 key combinations which may correspond to entire words or phrases which could, for example, be supplied to a speech synthesizer or similar communication device. The reduced stress afforded by the ergonomically correct construction of the keyboard should greatly relieve the stress associated with communication for these individuals.

The present invention also provides an advantage for typing in languages having large character sets such as Chinese or Japanese; the relatively simple interface of the present invention, augmented as needed primarily with additional shift keys, can generate a large number of characters. Indeed, the present invention provides a way to enter character data from virtually every language using the same physical keyboard.

The present invention also mitigates RSI in several ways. The user is not required to sit in a fixed position; even using a cable as the communications link, the typist can move about freely while still being able to continue to enter data up to the limit established by the wire. The data input unit is also symmetrical and may be freely used by either hand; thus, the other hand may be used when the first hand tires. The hand can relax completely when not actually entering data. A strap around the back of the hand holds it comfortably in place so that the typist need exert no effort to grip the device.

The hand held, ergonomically correct cybernetic interface of the present invention should make a contribution to the general ability of users to control machines in ways that cannot yet be foreseen. Perhaps the most significant contribution foreseen for the present invention is to overcome the disadvantages of the chord keyboards of the prior art and finally turn the nascent promise of such keyboards into practical reality.

DETAILED DESCRIPTION

Figure 1:
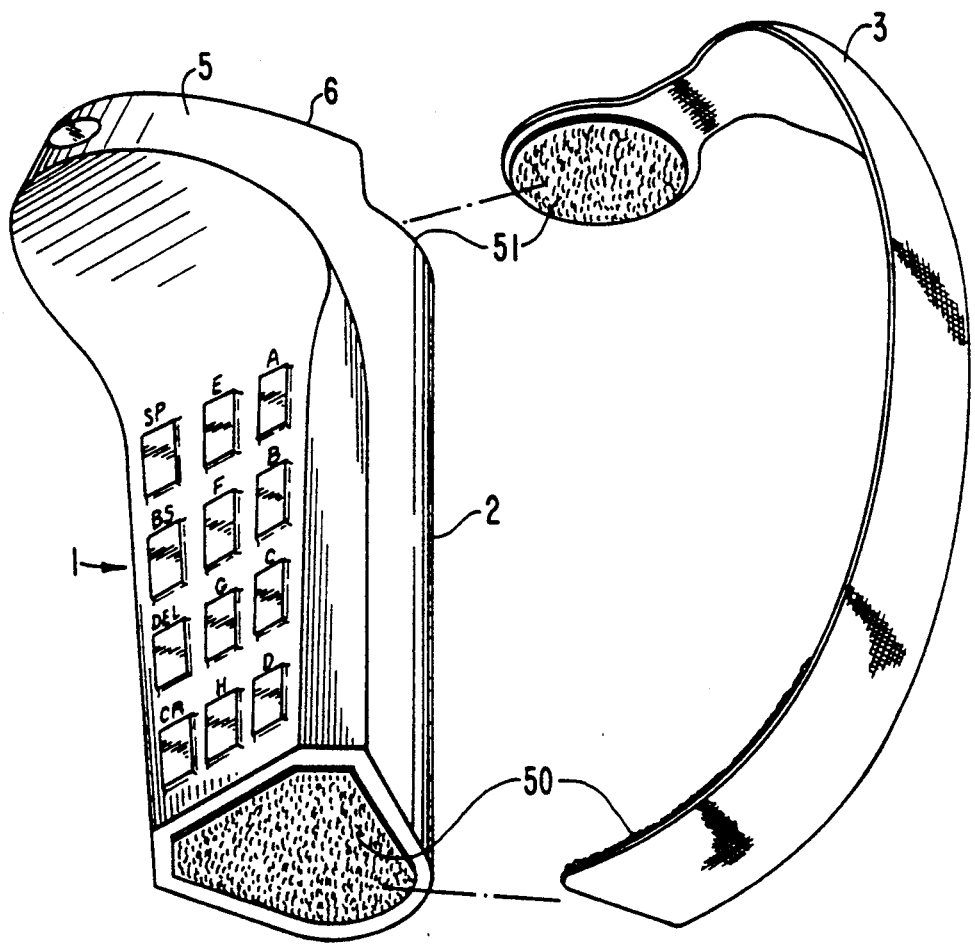
FIG. 1 is a front perspective view of the hand held, data input unit of the present invention, showing the chord keyboard and hand strap according to the present invention.
Figure 3:
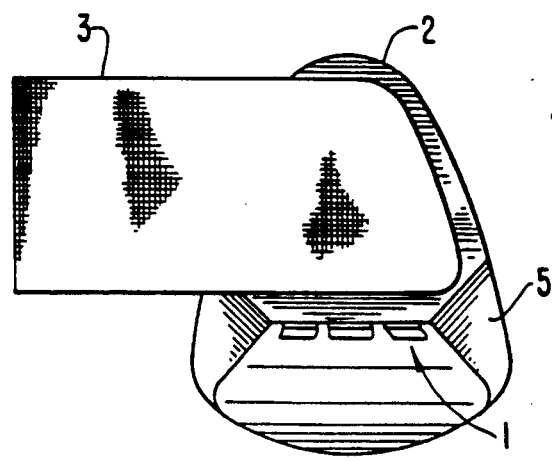
FIG. 3 is a bottom perspective view of the data input unit.
Figure 2:
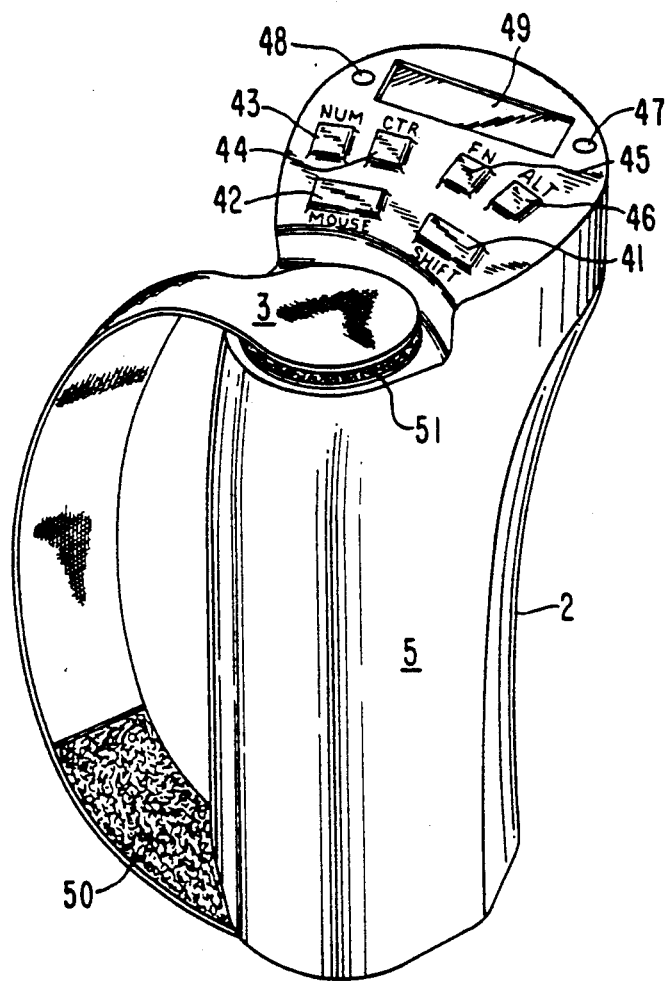
FIG. 2 is a rear perspective view of the data input unit, including the keyboard, shown in FIG. 1.

FIGS. 1 and 2 illustrate the ergonomic design of the hand-held data input unit according to the present invention. The keyboard 1 for the four fingers of a user's hand is positioned opposite back side 2 of the unit which faces the strap or band 3. The keyboard can be grasped by a hand 4 in the manner illustrated in FIG. 4.

The hand held chord keyboard shown in FIGS. 1 and 2 has an ergonomic design that places the keyboard on the front face of the data input unit in the area normally grasped by the fingers. This design is considered optimal for typing because it enables the user to grasp the handle and type in a manner which most nearly approximates the hand movements necessary for clenching a fist. It is to be appreciated that the motion needed to clench a fist is far more natural than that needed to type on a conventional, QWERTY-type keyboard. The stress placed on the typist should therefore be minimized, thus overcoming part of the disadvantage of having to make more key strokes to generate some characters.

Figure 4:
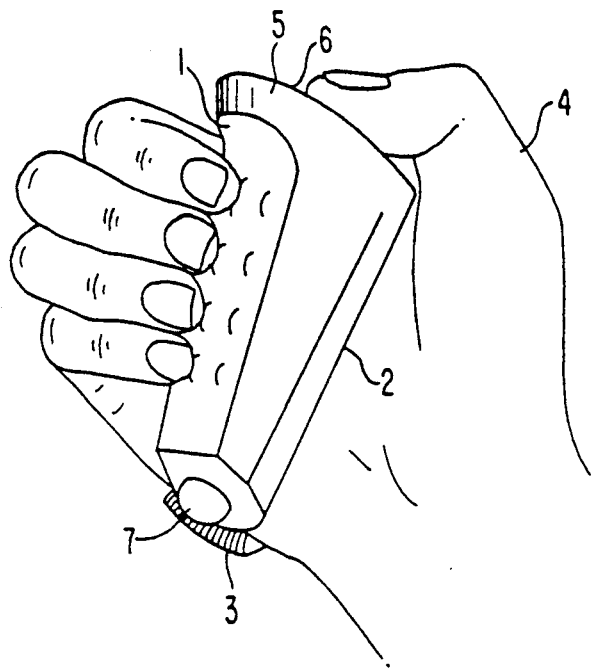
FIG. 4 is another perspective view of the data input unit showing how the unit is grasped during operation of the chord keyboard.

The data input unit in FIGS. 1 and 2 shows the right-left symmetry of the handle of the preferred embodiment. Specifically, the handle has an elongated, generally triangular cross-sectional symmetrical shape, and a flat front face. It is also designed so that the chord keyboard and other elements are arranged symmetrically so that the data input unit may be operated by the user's right or left hand. Also, band 3 can be adjusted for use by either the right or left hand. These features enable the operator to use the same unit interchangeably between the left and right hand. Velcro or similar pads 50 and 51 serve to enable adjustment of the band 3 for left or right hand usage and to adjust the tension of the band for the user's comfort The housing 5 of the data input unit can be made of a tough, injection molded plastic. Components such as circuit boards, a tilt sensor and a battery can be embedded inside housing 5. The keys operated by the thumb of the user's hand are located on the top surface 6 of the data input unit, in the area normally grasped by the thumb so that when typing, the thumb movements approximate those necessary for clenching a fist. The top surface is generally flat and inclined at an angle to the horizontal, as shown in FIGS. 1 and 2. FIG. 4 shows how the device is held in the hand of a user and also shows a roller ball sensor 7 that functions as an alternate way of positioning the pointer.

Figure 5:
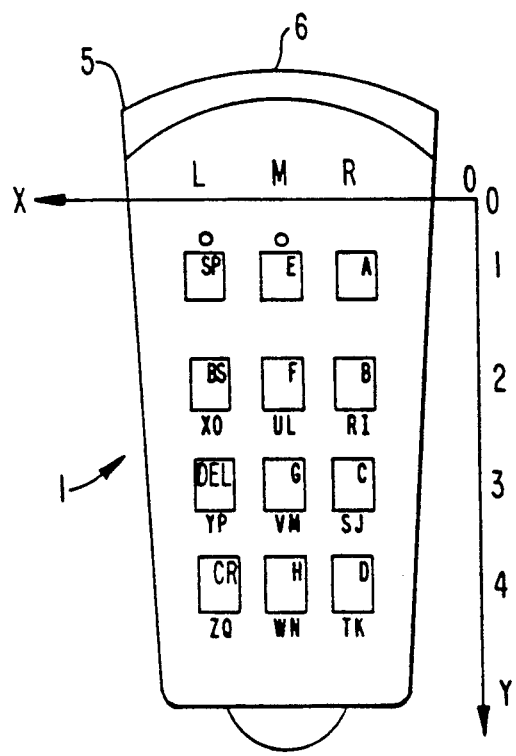
FIG. 5 is a plan view of the data input unit illustrating an exemplary key layout for the chord keyboard of the present invention.

FIG. 5 shows one possible arrangement of the keypad for the chord keyboard of the present invention. The keys are arranged in a third quadrant projection with the keys for the beginning of the alphabet in the upper right hand corner and the last keys of the alphabet in the lower left hand corner. Other arrangements are, of course, possible. The key assignments are controlled by a software look up routine so that they can be reassigned, preferably by the user.

The keys along the leftmost column in FIG. 5, specifically keys 1L, 2L, 3L and 4L, are the space key, backspace key, delete and enter keys, respectively. These functions can be generated by merely depressing and releasing the respective keys individually. Likewise, the key pads labeled A-H generate their respective characters when depressed and released. The characters written below keys R,2-4, M,2-4 and L,2-4 are generated by depressing and releasing both those keys and the keys at 1L and 1M. For example, depressing and releasing keys 1L and 2R, generates the character "i", whereas depressing and releasing keys 1M and 2R generates the character "r". When more than one key is required for a character, either all keys required are depressed and released at the same time, or all keys may be depressed and held in sequence, the desired character being registered only when at least one key is released.

The center row of keys, the keys along column M, can have tiny bumps or a ridge to aid in keeping the fingers aligned. Further, the learning process can be facilitated by printing the characters on their corresponding keys. This printing can be accomplished using a color coded scheme for the characters requiring the user to depress more than one key. For example, a blue dot can be placed above key 1M and a red dot above key 1L. The blue dot would be used to generate the character on the left side below the respective key, whereas the red dot would generate the character shown on the right side. The characters could be color coded with the color of the dots so as to facilitate easier identification.

The use of twelve keys in the manner shown in FIG. 5 means that only one or two keys must be used at any given moment to generate all the characters of the alphabet. The combination of twelve keys, thus, reduces the total number of keystrokes without creating a confusing number of keys on the chord keyboard.

Figure 6:
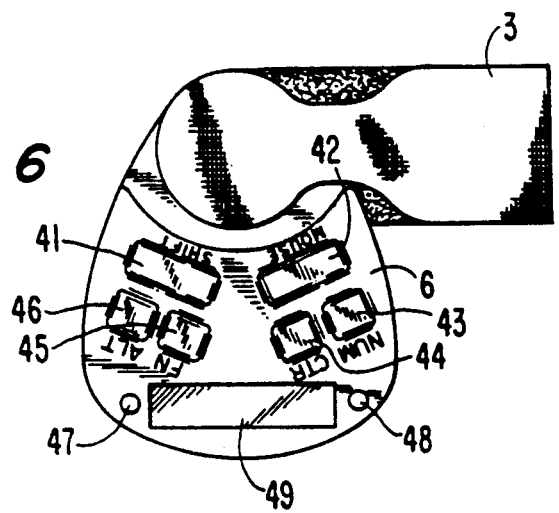
FIG. 6 is a top view of the data input unit illustrating the layout of the shift keys actuated by the thumb.

FIG. 6 shows the shift keyboard of the data input unit shown in FIGS. 1 and 2. Keys 41 through 46 are controlled by the thumb as shown in FIG. 4. Key 45 corresponds to the function key that converts the keys shown in FIG. 1 into function keys of the type typically set off in a separate row on a conventional keyboard. Key 42 engages the "mouse" function to send pointer position information to the computer. Key 43 corresponds to the numerical shift key used to generate numbers in conjunction with the key pad shown in FIG. 5. Key 44 represents the control key, key 46 the alternate key, and key 41 the shift key. With the exception of the "mouse" and number shift keys, these keys correspond to keys normally found spread out on a conventional, QWERTY keyboard. The present invention, however, places the keys together in one convenient place. Also, as shown in FIG. 2, the arrangement of the keys on top face 6 of the handle is symmetrical to enable right and left hand use. Variations in the thumb key designations are envisioned for certain computers such as the Apple Macintosh.

The upper and lower rows of keys 41-46 are arranged so that the thumb can depress any one key individually or two keys simultaneously. This arrangement of keys is necessary due to the command structure of personal computers. For example, "shift" and "function" are often pressed together in specific commands. The layout of keys shown in FIG. 2 facilitates this function.

FIG. 6 further illustrates two indicating LED's 47, 48 that are located on the top of the data input unit adjacent the top keyboard. LED 47 may function to indicate when the battery of the unit is low. The LED 48 can light each time that the keyboard generates a character for transmission to the base unit of the computer. The purpose of LED 48 is to provide the user with maximum feedback about the operation of the chord keyboard and the data input unit. The optional display 49 can display either data from the remote computer or from an integral computer contained within the handle.

Figure 7:
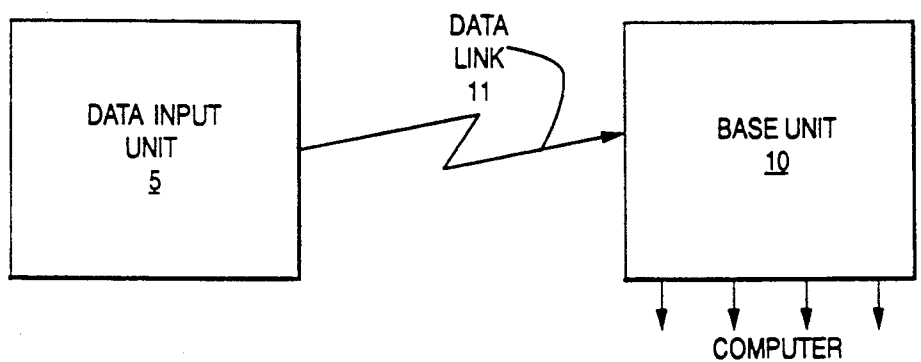
FIG. 7 is a block diagram of the data input unit and the base unit of the present invention.

FIG. 7 is a block diagram illustrating the wireless embodiment of the data input unit and the base unit of the present invention. The data input unit 5 is illustrated in FIGS. 1 and 2. The base unit 10 is located at the computer and communicates with the central processing unit. A data link 11 transfers data from the data input unit 5 to the base unit 10. In a hard wired version, wires may be connected directly through either the serial port or through the keyboard ports to the computer. It is also possible to establish a wireless, radio frequency link between the data input unit and the base unit. One frequency band suitable for the RF transmission is that assigned to radio frequency transmissions for equipment such as cordless telephones. The wire connection would be preferable if a large number of data input units are used within a confined space so as to minimize interference and cross talk between the units. Alternately, an infrared or ultrasonic emitter/detector system could be used in a wireless system between the data input unit and the base unit.

Figure 8:
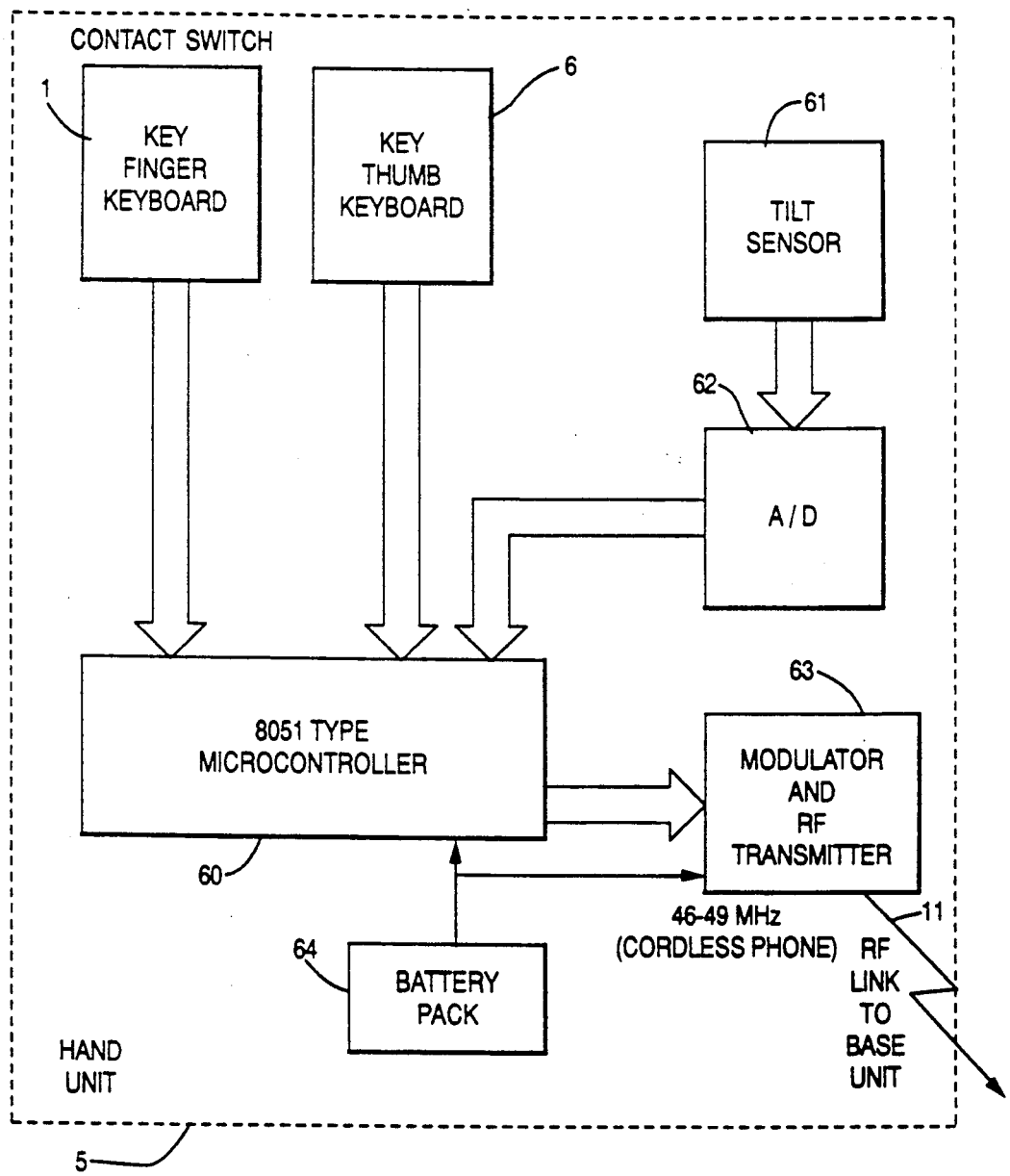
FIG. 8 is a block diagram of the data input unit of the present invention.

FIG. 8 is a block diagram of the data input unit shown in FIG. 7. The keypad 1 shown in FIGS. 1 and 2 and the thumb keypad shown in FIGS. 2 and 6 each supply data input to a microprocessor 60. The keypads can comprise contact switches and the microprocessor can be any of several well known types, such as model 8051 made by Intel or model S87C751 made by Signetics.

Sensor 61 can be a tilt sensor such as the electrolytic tilt sensor Model SP5000 manufactured by the Spectron Corporation of Hauppauge, N.Y., and is controlled by the microprocessor 60. The tilt sensor, read by the microprocessor, produces an analog signal that is digitized by an analog to digital (A/D) converter 62 and supplied to microprocessor 60. The tilt sensor and A/D converter are elements that are well known in the art. The sensor could also be a roller ball sensor, two pairs of translational motion acclerometers or a pair of angular acclerometers, all of which are known in the art and therefore not described further.

The microprocessor converts the input signals from the keyboard into three byte scan codes and transfers them to the transmission circuit 63. The transmission circuit could be a modulator for transmitting the signal wirelessly, or a direct cable or wire connection to either the serial or keyboard ports of a computer.

Figure 9:
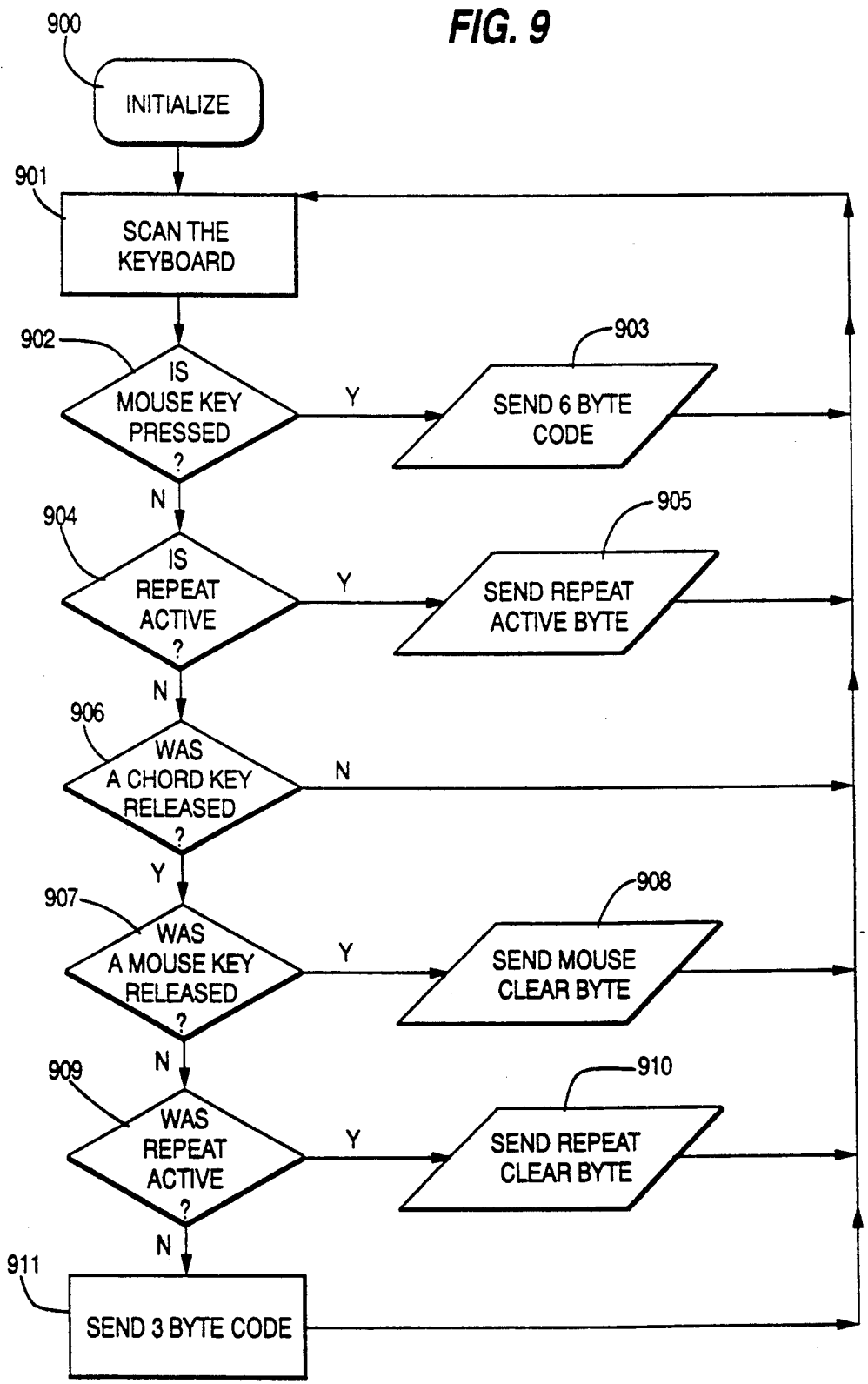
FIG. 9 is a flow chart of the program used to generate the three types of data generated by the data input unit of the present invention.

FIG. 9 is a flow chart showing the program executed by microprocessor 60 in the data input unit. After initialization at step 900, microprocessor 60 repeatedly determines whether data has been entered into the hand unit by scanning all the inputs to the data input unit at step 901. If no data has been received since the last scan, then the microprocessor continues to scan until some data is received.

Once data is entered, the microprocessor 60 begins to determine the type of data involved. If the mouse key 42 is depressed at step 902, microprocessor 60 generates a six byte code at step 903 corresponding to tilt information generated by the tilt sensor. The six byte code is transferred to the base unit over the communications link. The program returns to scanning its inputs at step 901 until the data input unit receives some more data. In this way, the data input unit generates pointer control information only when the user depresses mouse key 42. This feature helps to extend the life of any batteries used to power the data input unit.

The microprocessor determines at step 904 whether to repeat a key that has previously been depressed. Microprocessor 60 generates a repeat active byte at step 904 and resumes scanning at step 901. The repeat active step is determined with respect to a flag that is set in initialization step 900 and that can only be changed in subsequent processing steps described below. The basic criterion, however, is that an alphanumeric character is repeated if the same character is requested twice in succession, holding the keys down the second time. This method of repeating a character is known in the art as exemplified by IBM Technical Disclosure Bulletin Vol. 22, No. 12, May, 1980 by F. C. Bequaert, and therefore will not be described further here.

Microprocessor 60 determines at step 906 whether any key has been released in the current scan cycle. If it has not, microprocessor 60 returns to scanning its inputs at step 901 without taking further action.

After step 907, the microprocessor knows that the data input it has received came from the release of a key on the chord keyboard—either from the keyboard 1 or the shift keys 41-46. At step 907 the microprocessor determines if the mouse key 42 was released. If yes, then the microprocessor generates a mouse clear byte to the base unit at step 908 and returns to scanning for input at step 901. The microprocessor determines at step 909 if the repeat key was previously active. If it was, then the microprocessor assumes that the key is no longer to be repeated and generates a one byte command at step 908 to clear the repeat function before resuming scanning at step 901.

By the time the microprocessor reaches step 911, it has exhausted all other possibilities; the input data received by the microprocessor corresponds to a keyboard scan code. Microprocessor 60 then generates a three byte code indicative of the scan code input and returns to scanning for additional input at step 901.

Figure 10:
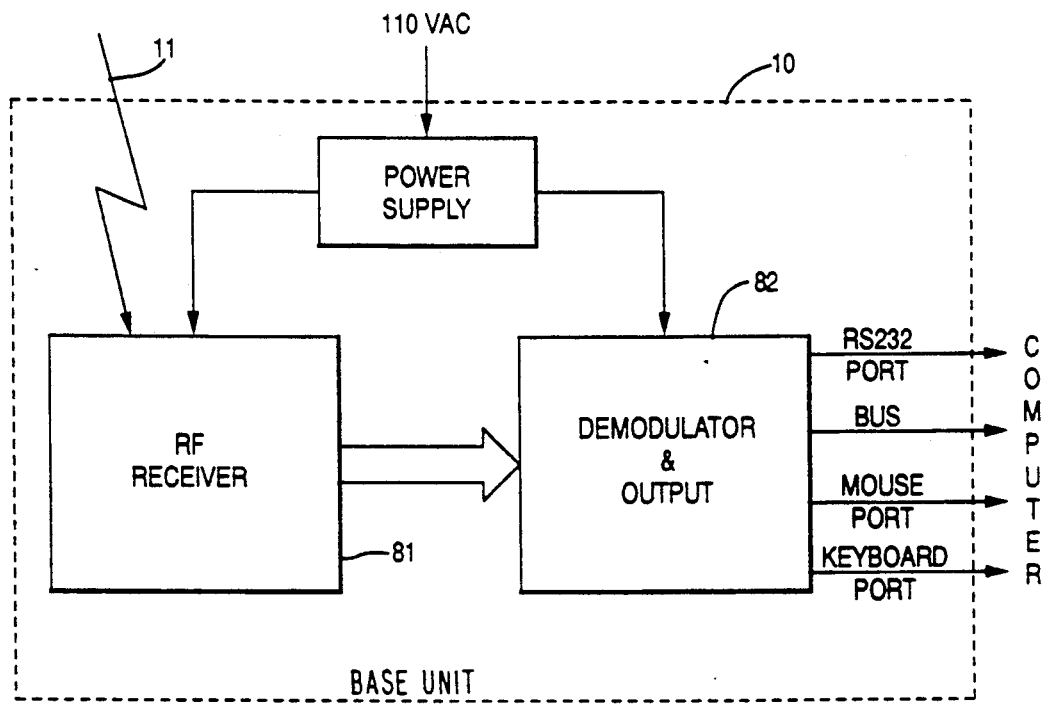
FIG. 10 is a block diagram of the base unit of the present invention.

FIG. 10 is a block diagram of the base unit 10 shown in FIG. 7. The communications link 11 transfers the input data signal from the data input unit to the receiver 81. A demodulator unit 82 demodulates and formats the scan codes from the data input unit for transmission to the computer. The base unit 10 can have connections to the keyboard port 83, mouse port 84, RS232 port 85 or the bus 86 of the computer—a range of inputs normally available on a computer.

Figure 11:
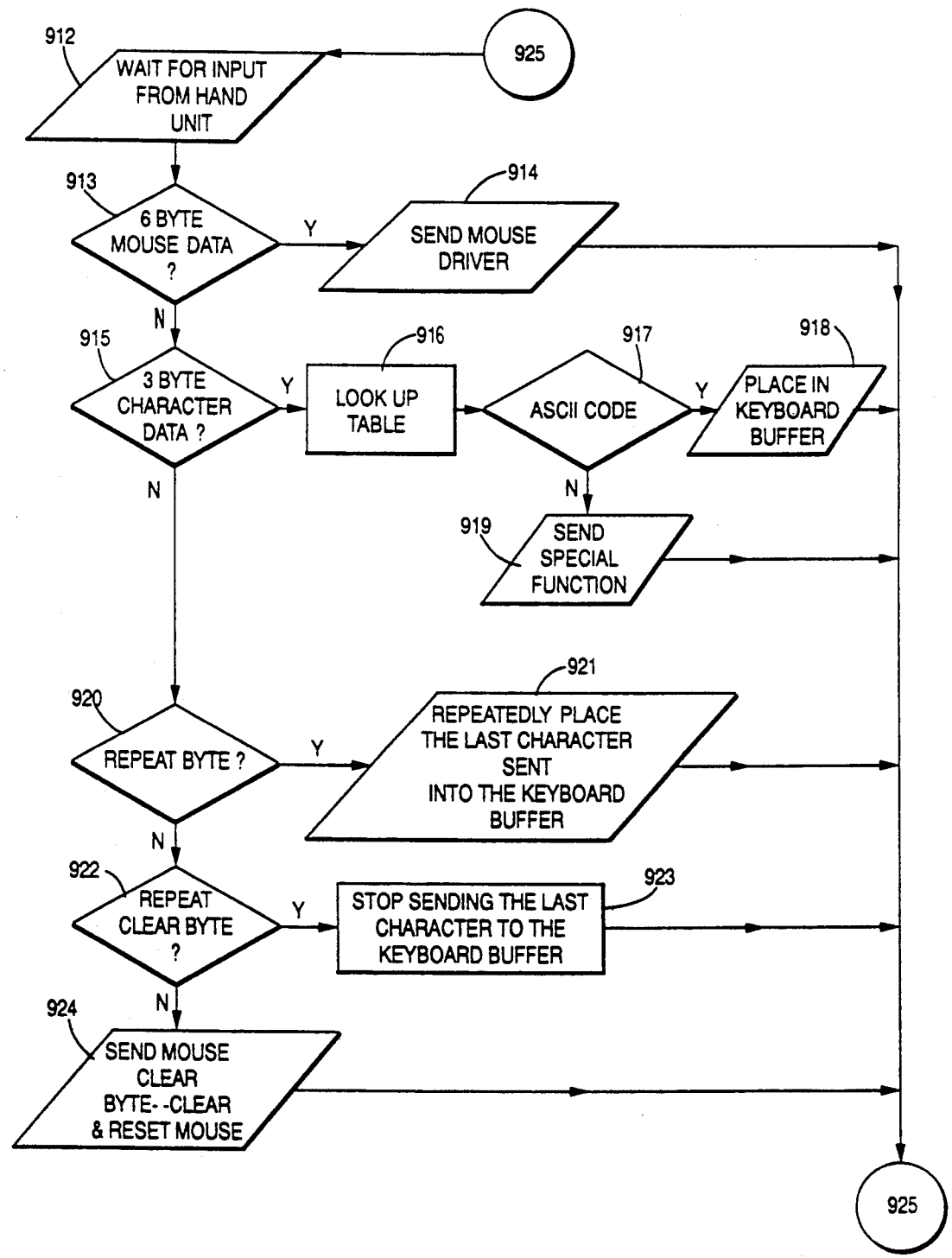
FIG. 11 is a flow chart of the program used by the computer to convert signals from the data input unit into computer commands.

FIG. 11 is a flow chart of the steps executed by the Terminate Stay Resident (TSR) program in the computer in response to input data being received from the data input unit. Upon generation of an interrupt at step 912 caused by a data present signal, the computer systematically proceeds to determine whether the input is any of three types generated by the data input unit—six byte mouse data, three byte key codes or one byte special function data.

The computer determines whether the input data received from the data input unit is six byte mouse data at step 913. If it is, then the data is directed to mouse driver software at step 914. The computer then exits the interrupt routine.

The computer determines whether the scan code from the data input unit is a character code at step 915. If it is, then program executes a subroutine at step 916 in which the three byte code can be transformed using a look up routine into a code that the computer can understand. Once this is done, however, the computer still must determine what kind of data it is. This determination is made at step 917 by asking whether the character from the look up routine is a recognized ASCII character. If it is, then it is placed in the keyboard buffer at step 918. Any character that is not in ASCII is a special function such as a number lock or caps lock command. The computer then exits at step 925.

At this point the computer determines at step 920 whether the code from the data input unit is a repeat byte. If it is, the computer repeatedly places the last ASCII character generated in step 916 back into the keyboard buffer. The character will continue to repeat until the computer recognizes a repeat clear character at step 922 generated by the data unit upon release of the key(s) and stops the character generation at step 923. In either instance the computer ultimately exits again at step 925.

Any character that has not been recognized up to this point is presumed to be a mouse clear character corresponding to a release of the mouse key at step 924. The computer then again exits the character generation routine at step 925.

Although key assignments may be changed by the user, an exemplary set of key assignments for generating input data for the computer is as follows:

Key Assignment Table

| Value | To Access Hex Code | Decimal Code | Press and Release These Keys Thumb Keys: | Finger Keys: |
|---|---|---|---|---|
| (space) | 20 | 32 | NONE | 1L |
| ! | 21 | 33 | " | 1R, 3L |
| " | 22 | 34 | " | 1R, 3M |
| # | 23 | 35 | " | 2M, 4L |
| $ | 24 | 36 | " | 2L, 3R |
| % | 25 | 37 | " | 3R, 4M |
| & | 26 | 38 | " | 2L, 4L |
| ' | 27 | 39 | " | 1R, 2M |
| ( | 28 | 40 | " | 2L, 3L |
| ) | 29 | 41 | " | 2R, 3L |
| * | 2A | 42 | " | 3L, 4M |
| + | 2B | 43 | " | 3M, 4L |
| , | 2C | 44 | " | 1R, 2R |
| - | 2D | 45 | " | 1R, 4L |
| . | 2E | 46 | " | 1R, 4R |
| / | 2F | 47 | Num/Sym | 1M, 4M |
| 0 | 30 | 48 | Num/Sym | 2L |
| 1 | 31 | 49 | Num/Sym | 1R |
| 2 | 32 | 50 | Num/Sym | 2R |
| 3 | 33 | 51 | Num/Sym | 3R |
| 4 | 34 | 52 | Num/Sym | 4R |
| 5 | 35 | 53 | Num/Sym | 1M |
| 6 | 36 | 54 | Num/Sym | 2M |

-continued

Key Assignment Table

| Value | To Access Hex Code | Decimal Code | Press and Release These Keys Thumb Keys: | Finger Keys: |
|---|---|---|---|---|
| 7 | 37 | 55 | Num/Sym | 3M |
| 8 | 38 | 56 | Num/Sym | 4M |
| 9 | 39 | 57 | Num/Sym | 1L |
| : | 3A | 58 | None | 3R, 4L |
| ; | 3B | 59 | " | 1R, 3R |
| < | 3C | 60 | Num/Sym | 1M, 4L |
| = | 3D | 61 | None | 3M, 4R |
| > | 3E | 62 | Num/Sym | 1R, 3R |
| ? | 3F | 63 | None | 1R, 2L |
| @ | 40 | 64 | None | 3L, 4R |
| A | 41 | 65 | Shift | 1R |
| B | 42 | 66 | Shift | 2R |
| C | 43 | 67 | Shift | 3R |
| D | 44 | 68 | Shift | 4R |
| E | 45 | 69 | Shift | 1M |
| F | 46 | 70 | Shift | 2M |
| G | 47 | 71 | Shift | 3M |
| H | 48 | 72 | Shift | 4M |
| I | 49 | 73 | Shift | 1L, 2R |
| J | 4A | 74 | Shift | 1L, 3R |
| K | 4B | 75 | Shift | 1L, 4R |
| L | 4C | 76 | Shift | 1L, 2M |
| M | 4D | 77 | Shift | 1L, 3M |
| N | 4E | 78 | Shift | 1L, 4M |
| O | 4F | 79 | Shift | 1L, 2L |
| P | 50 | 80 | Shift | 1L, 3L |
| Q | 51 | 81 | Shift | 1L, 4L |
| R | 52 | 82 | Shift | 1M, 2R |
| S | 53 | 83 | Shift | 1M, 3R |
| T | 54 | 84 | Shift | 1M, 4R |
| U | 55 | 85 | Shift | 1M, 2M |
| V | 56 | 86 | Shift | 1M, 3M |
| W | 57 | 87 | Shift | 1M, 4M |
| X | 58 | 88 | Shift | 1M, 2L |
| Y | 59 | 89 | Shift | 1M, 3L |
| Z | 5A | 90 | Shift | 1M, 4L |
| [ | 5B | 91 | Num/Sym | 1R, 2M |
| ® | 5C | 92 | Num/Sym | 1R, 3M |
| ] | 5D | 93 | Num/Sym | 1R, 4M |
| © | 5E | 94 | Num/Sym | 1L, 2M |
| — | 5F | 95 | None | 2R, 4L |
| ° | 60 | 96 | Num/Sym | 1R, 3L |
| a | 61 | 97 | None | 1R |
| b | 62 | 98 | " | 2R |
| c | 63 | 99 | " | 3R |
| d | 64 | 100 | " | 4R |
| e | 65 | 101 | " | 1M |
| f | 66 | 102 | " | 2M |
| g | 67 | 103 | " | 3M |
| h | 68 | 104 | " | 4M |
| i | 69 | 105 | " | 1L, 2R |
| j | 6A | 106 | " | 1L, 3R |
| k | 6B | 107 | " | 1L, 4R |
| l | 6C | 108 | " | 1L, 2M |
| m | 6D | 109 | " | 1L, 3M |
| n | 6E | 110 | " | 1L, 4M |
| o | 6F | 111 | " | 1L, 2L |
| p | 70 | 112 | " | 1L, 3L |
| q | 71 | 113 | " | 1L, 4L |
| r | 72 | 114 | " | 1M, 2R |
| s | 73 | 115 | " | 1M, 3R |
| t | 74 | 116 | " | 1M, 4R |
| u | 75 | 117 | " | 1M, 2M |
| v | 76 | 118 | " | 1M, 3M |
| w | 77 | 119 | " | 1M, 4M |
| x | 78 | 120 | " | 1M, 2L |
| y | 79 | 121 | " | 1M, 3L |
| z | 7A | 122 | " | 1M, 4L |
| § | 7B | 123 | Num/Sym | 1R, 4L |
|  | 7C | 124 | Num/Sym | 1L, 2L, 3R |
|  | 7D | 125 | Num/Sym | 1L, 2L, 4R |
| ™ | 7E | 126 | Num/Sym | 1L, 2L, 3M |
| DEL | 7F | 127 | None | 3L |
| BS | 08 | 8 | None | 2L |
| HT (Tab) | 09 | 9 | " | 1M, 2M, 4M |
| CR (Enter) | 0D | 13 | " | 4L |
| ESC | 1B | 27 | Alt | 2L |

-continued

Key Assignment Table

| Value | To Access Hex Code | Decimal Code | Press and Release These Keys Thumb Keys: | Finger Keys: |
|---|---|---|---|---|
| Left Tab | | | None | 1M, 2M, 3M |
| INSERT | | | Function | 1L, 2L, 3R |
| HOME | | | None | 2R, 3R, 4R |
| END | | | " | 2L, 3L, 4L |
| Print Screen | | | Function | 1L, 2L, 3M |
| Arrow Up | | | None | 2M, 3R |
| Arrow Down | | | " | 2M, 3L |
| Arrow Left | | | " | 2M, 3M |
| Arrow Right | | | " | 2M, 4M |
| Pause | | | Function | 1L, 2L, 4R |
| Break | | | Function | 1L, 2L, 4M |
| Scroll Lock | | | Function | 1L, 2L, 4L |
| Num/Lock | | | Function | 1L, 2L, 3L, 4R |
| Page Up | | | None | 3R, 4R |
| Page Down | | | " | 3L, 4L |
| Caps Lock | | | Function | 1L, 2L, 3L |
| F1 | | | Function | 1R |
| F2 | | | Function | 2R |
| F3 | | | Function | 3R |
| F4 | | | Function | 4R |
| F5 | | | Function | 1M |
| F6 | | | Function | 2M |
| F7 | | | Function | 3M |
| F8 | | | Function | 4M |
| F9 | | | Function | 1L |
| F10 | | | Function | 2L |
| F11 | | | Function | 3L |
| F12 | | | Function | 4L |
| Keyboard Control/Help | | | None | 1M, 2M, 3M, 4M |
| Mouse Control/Help | | | Mouse | 1M, 2M, 3M, 4M |
| Mouse Enable | | | " | None |
| Mouse Click | | | " | 1R |
| Double Click | | | " | 2R |
| Mouse - Low-res | | | " | 3R |
| Hi-res | | | " | 4R |
| Extra Hi-res | | | " | 3R, 4R |
| "the" | | | None | 2R, 3R |
| "of" | | | " | 2R, 3M |
| "to" | | | " | 2R, 4R |
| "ed" | | | " | 2M, 4R |
| "and" | | | " | 1R, 4M |
| "in" | | | " | 2R, 4M |
| "ion" | | | " | 2L, 4M |
| "ing" | | | " | 3M, 4M |

The foregoing table is one example of the key assignments which can be made; the assignments can be reprogrammed to customize the data input unit as desired.

The software for the microprocessor functions described above in connection with the data input unit may comprise the following listings, which are written in PLM and assembler language respectively, for the Signetics S87C51 microprocessor.

```
/**** Literal definitions ****/ declare lit       literally 'literally';
    declare dcl       lit       'declare';
    dcl     extrn     lit       'external';
    dcl     const     lit       'constant';
    dcl     struct    lit       'structure';
    dcl     Forever   lit       'while 1';
    dcl     wait      lit       'do while not';

$INCLUDE(\INTEL\INCLUDE\REG751.DCL)

/* Globle constants */ dcl TRUE          lit       '1',
        FALSE         lit       '0',
        db_max_count  lit       '8',
        vert_adc      lit       '8',
        horz_adc      lit       '9',
        minus_adc     lit       '2';
/****************************************************************
       GLOBLE VARIABLES DECLARED IN THIS MODULE
*****************************************************************/ dcl
        last_keys(3)    byte,
        active_keys(3)  byte,
        proc_keys(3)    byte,
        db_count        byte,
        mouse_timer     byte,
        key_state       byte;

dcl
        (up_dn_adc,
         lt_rt_adc)     word     public;
```

```
    dcl
       (key_active,
        repeat_active,
        mouse_active,
        send_keys,
        send_repeat_enable,
        send_repeat_clear,
        send_mouse_clear) bit;

dcl
       (timer_flag)      bit     public;

/****************************************************************
*           GLOBLE VARIABLES DECLARED IN TWDA.SRC                *
****************************************************************/ dcl
       (tilt_hi,
        tilt_lo)         bit     extrn;

dcl
       (sr_jump,
        sr_ptr)          byte    extrn,
        sr_buf(6)        byte    extrn;

/****************************************************************
*        ASSEMBLY LANGUAGE ROUTINES DECLARED IN TWDA.SRC         *
****************************************************************/

READ_ADC0834: PROCEDURE (ADC_ADDR) BYTE EXTRN;
  DCL ADC_ADDR BYTE;
END READ_ADC0834;

SCAN_KEYS: PROCEDURE (KEY_ADDR) EXTRN;
  DCL KEY_ADDR BYTE;
END SCAN_KEYS;

COMPARE_KEYS: PROCEDURE (KEY_ADDR_0,KEY_ADDR_1) BIT EXTRN;
  DCL (KEY_ADDR_0,KEY_ADDR_1) BYTE;
END COMPARE_KEYS;

MOVE_KEYS: PROCEDURE (DEST_KEY_ADDR,SRC_KEY_ADDR) EXTRN;
  DCL (DEST_KEY_ADDR,SRC_KEY_ADDR) BYTE;
END MOVE_KEYS;

CLEAR_KEYS: PROCEDURE (KEY_ADDR) EXTRN;
  DCL KEY_ADDR BYTE;
END CLEAR_KEYS;

ONE_RELEASED: PROCEDURE (NEW_KEY_ADDR,OLD_KEY_ADDR) BIT EXTRN;
  DCL (NEW_KEY_ADDR,OLD_KEY_ADDR) BYTE;
END ONE_RELEASED;

KEY_ADDED: PROCEDURE (NEW_KEY_ADDR,OLD_KEY_ADDR) BIT EXTRN;
  DCL (NEW_KEY_ADDR,OLD_KEY_ADDR) BYTE;
END KEY_ADDED;

NO_KEYS_DOWN: PROCEDURE (KEY_ADDR) BIT EXTRN;
  DCL KEY_ADDR BYTE;
END NO_KEYS_DOWN;

SETUP_BUFFER: PROCEDURE EXTRN;
END SETUP_BUFFER;
```

```
MOUSE_PRESSED: PROCEDURE (KEY_ADDR) BIT EXTRN;
  DCL KEY_ADDR BYTE;
END MOUSE_PRESSED;

/****************************************************************
*                    START OF PLM ROUTINES                       *
****************************************************************/

/****************************************************************
*                  READ ADC CHANNEL AND AVERAGE                  *
****************************************************************/ avg_adc: procedure (adc_addr,adc_data_ptr);
  dcl (adc_addr,adc_data_ptr) byte;
  dcl adc_avg based adc_data_ptr word;

adc_avg = ((7 * adc_avg) / 8) + 256;
  adc_avg = (adc_avg + double(read_adc0834(adc_addr))) -
            double(read_adc0834(adc_addr or minus_adc));

end avg_adc;

/****************************************************************
*                      DEBOUNCE THE KEYS                         *
****************************************************************/ key_debounce: procedure bit;

dcl these_keys(3) byte;
  dcl key_match bit;

call scan_keys(.these_keys);
  key_match = compare_keys(.these_keys,.last_keys);
  call move_keys(.last_keys,.these_keys);

if key_match and not compare_keys(.active_keys,.these_keys) then do;
      db_count = db_count + 1;
      if db_count > db_max_count then
        do;
          db_count = 0;
          return true;
        end;
      else
        return false;
    end;
  else
    do;
      db_count = 0;
      return false;
    end;

end key_debounce;
/****************************************************************
*                      KEY STATE MONITOR                         *
****************************************************************/ key_state_monitor: procedure;

/* key_state              function
         0                  waiting for key added
         1                  waiting for released
         2                  waiting for repeat sequence
         3                  repeat active state
         4                  mouse active
         5                  wait mouse all clear
```

```
*/
         dcl     wait_key_added        lit '0';
         dcl     wait_released         lit '1';
         dcl     wait_repeat_start     lit '2';
         dcl     wait_repeat_clear     lit '3';
         dcl     mouse_state           lit '4';
         dcl     wait_mouse_clear      lit '5';

if not mouse_active and mouse_pressed(.last_keys) then
       do;
          mouse_active,send_keys = true;
          mouse_timer = 0;
          key_state = mouse_state;
          if testclear(repeat_active) then
             send_repeat_clear = true;
       end;

do case key_state;

c_wait_key_added:
       do;
          if key_added(.last_keys,.active_keys) then
             key_state = wait_released;
       end;

c_wait_released:
       do;
          if key_added(.last_keys,.active_keys) then
             do;
                call move_keys(.active_keys,.last_keys);
                return;
             end;
          if not compare_keys(.last_keys,.active_keys) then
             do;
                if one_released(.last_keys,.active_keys) then
                   key_state = wait_repeat_start;
                else
                   key_state = wait_key_added;
                send_keys = true;
                call move_keys(.proc_keys,.active_keys);
             end;
       end;

c_wait_repeat_start:
       do;
          if key_added(.last_keys,.active_keys) then
             do;
                if compare_keys(.proc_keys,.last_keys) then
                   do;
                      repeat_active = true;
                      key_state = wait_repeat_clear;
                      send_repeat_enable = true;
                   end;
                else
                   key_state = wait_released;
             end;
          else
             key_state = wait_key_added;
       end;

c_wait_repeat_clear:
       do;
          repeat_active = false;
          send_repeat_clear = true;
          if key_added(.last_keys,.active_keys) then
             key_state = wait_released;
          else
             key_state = wait_key_added;
       end;
```

```
      c_mouse_active:
      do;
        call move_keys(.proc_keys,.last_keys);
        if not mouse_pressed(.last_keys) then
          do;
            mouse_active = false;
            send_mouse_clear = true;
            if no_keys_down(.last_keys) then
              key_state = wait_key_added;
            else
              key_state = wait_mouse_clear;
          end;
      end;

c_wait_mouse_clear:
      do;
        if no_keys_down(.last_keys) then
          key_state = wait_key_added;
      end;

end;

call move_keys(.active_keys,.last_keys);
  end key_state_monitor;

/******************************************************************
*                         INIT PROCEDURE                           *
******************************************************************/ send_rs232: procedure;

/* repeat enable sequence -- one byte

|b7|b6|b5|b4|b3|b2|b1|b0|
    sr_buf(0)  | 0| 0| 0| 0| 1| 1| 0| 1|     clf character repeat clear sequence -- one byte

|b7|b6|b5|b4|b3|b2|b1|b0|
    sr_buf(0)  | 0| 0| 0| 0| 1| 0| 1| 0|     lf character mouse clear sequence -- one byte

|b7|b6|b5|b4|b3|b2|b1|b0|
    sr_buf(0)  | 0| 0| 0| 0| 1| 1| 0| 0|     char(12)

normal key sequence -- three bytes

|b7|b6|b5|b4|b3|b2|b1|b0|
    sr_buf(0)  | 0| 1|2L|2M|2R|1L|1M|1R|
    sr_buf(1)  | 1| 0|4L|4M|4R|3L|3M|3R|
    sr_buf(2)  | 1| 1|MO|AL|CL|FN|NM|SH| mouse key sequence -- six bytes

|b7|b6|b5|b4|b3|b2|b1|b0|
    sr_buf(0)  | 0| 1|2L|2M|2R|1L|1M|1R|
    sr_buf(1)  | 1| 0|4L|4M|4R|3L|3M|3R|
    sr_buf(2)  | 1| 0|MO|AL|CL|FN|NM|SH|
    sr_buf(3)  | 1| 0|V5|V5|V3|V2|V1|V0|     V = up/down
    sr_buf(4)  | 1| 0|H2|H1|H0|V8|V7|V6|     H = left/right sr_buf(5)  | 1| 1|H8|H7|H6|H5|H4|H3|     V8 and H8 are
sign bits
```

```
*/
  if send_mouse_clear then
    do;
      send_mouse_clear = false;
      sr_buf(0) = 12;
      goto start_rs232;
    end;
  if send_repeat_clear then
    do;
      send_repeat_clear = false;
      sr_buf(0) = 10;
      goto start_rs232;
    end;

if send_repeat_enable then
    do;
      send_repeat_enable = false;
      sr_buf(0) = 13;
      goto start_rs232;
    end;

if send_keys then
    do;
      send_keys = false;
      call move_keys(.sr_buf,.proc_keys);
      call setup_buffer;
      goto start_rs232;
    end;

if mouse_active then
    do;
      if mouse_timer > 20 then
        do;
          mouse_timer = 0;
          call move_keys(.sr_buf,.proc_keys);
          call setup_buffer;
          goto start_rs232;
        end;
      return;
    end;

start_rs232:

sr_jump = 0;
  sr_ptr = .sr_buf;
  tr = true;

end send_rs232;

/****************************************************************
*                         INIT PROCEDURE                        *
****************************************************************/ init: procedure;

rth = high(-160);
  rtl = low(-160);

sr_jump = 0;
  sr_ptr = .sr_buf;
          call clear_keys(.last_keys);
          call clear_keys(.active_keys);
          call clear_keys(.proc_keys);
            db_count, mouse_timer = 0;
```

```
      key_active,    repeat_active,    mouse_active,    send_keys,
send_repeat_enable,
      send_repeat_clear, send_mouse_clear = false;

i2cfg = 0;
   tirun = true;
   et = true;
   ea = true;
   eti = true;

end init;

/* main */ monitor: procedure public;

call init;

do forever;

wait timer_flag;
      end;

timer_flag = false;

if not tilt_lo then
         do;

if key_debounce then
               call key_state_monitor;

if (send_keys or send_repeat_enable or send_repeat_clear
or
                  mouse_active or send_mouse_clear) and not tr then
               call send_rs232;

if mouse_active then
               mouse_timer = mouse_timer + 1;
         end;
      else
         do;
            call avg_adc(vert_adc,.up_dn_adc);
            call avg_adc(horz_adc,.lt_rt_adc);
         end;

end;
end monitor;
ASMCODE SEGMENT CODE
ASMREGS SEGMENT DATA
ASMBUF  SEGMENT DATA
ASMSTK  SEGMENT IDATA
; ASMBITS SEGMENT BIT $INCLUDE(\INTEL\INCLUDE\REG751.PDF)

;       PUBLIC PLM INTERFACE DEFINITIONS

PUBLIC  READ_ADC0834, ?READ_ADC0834?BYTE
PUBLIC  SCAN_KEYS, ?SCAN_KEYS?BYTE
PUBLIC  COMPARE_KEYS, ?COMPARE_KEYS?BYTE
PUBLIC  ONE_RELEASED, ?ONE_RELEASED?BYTE
PUBLIC  CLEAR_KEYS, ?CLEAR_KEYS?BYTE
PUBLIC  KEY_ADDED, ?KEY_ADDED?BYTE
PUBLIC  MOVE_KEYS, ?MOVE_KEYS?BYTE
PUBLIC  SETUP_BUFFER
PUBLIC  MOUSE_PRESSED, ?MOUSE_PRESSED?BYTE
PUBLIC  NO_KEYS_DOWN, ?NO_KEYS_DOWN?BYTE
```

```
;       PUBLIC VARIABLE DECLARATIONS

PUBLIC  TILT_HI,TILT_LO
PUBLIC  SR_JUMP,SR_PTR,SR_BUF

;       EXTERNAL VARIABLE DECLARATIONS

EXTRN   DATA(UP_DN_ADC, LT_RT_ADC)
EXTRN   BIT(TIMER_FLAG)
EXTRN   CODE(MONITOR)

;       GLOBLE I/O BIT DEFINITIONS

TILT_HI         BIT     P1.3
TILT_LO         BIT     P1.2

;       SERIAL DATA OUTPUT REGISTER AND CONSTANT DEFINTIONS

RSEG    ASMREGS

BIT_COUNT:      DS      1
SR_JUMP:        DS      1
SR_PTR:         DS      1

RSEG    ASMBUF

SR_BUF:         DS      6
START_JUMP      EQU     0
DATA_JUMP       EQU     2
STOP_JUMP       EQU     4
END_JUMP        EQU     6

SR_DATA         BIT     P0.0
SPACE_TIME      EQU     -50

RSEG    ASMSTK

STACK:          DS      1;

CSEG    AT      0

RSET:   MOV     SP,#STACK - 1
        MOV     PSW,#0
        AJMP    MONITOR

;       TR CAN BE USED TO TELL IF SERIAL OUTPUT IS COMPLETE

CSEG    AT      0BH
        USING   0

AJMP    SERIAL_INTERRUPT

RSEG    ASMCODE

;       SERIAL DATA INTERRUPT ROUTINES
;               TIMER 0 IS USED

SERIAL_INTERRUPT:

PUSH    ACC
        PUSH    PSW
        PUSH    AR0
        PUSH    DPH
        PUSH    DPL
        MOV     A,SR_JUMP
        MOV     DPTR,#SR_JUMP_TABLE
        JMP     @A + DPTR
```

```
SR_JUMP_TABLE:

SJMP    START_BIT
        SJMP    DATA_BIT
        SJMP    STOP_BIT
        SJMP    SR_END

;       PROCESS EDGE INTERRUPT

START_BIT:
        MOV     SR_JUMP,#DATA_JUMP
        MOV     BIT_COUNT,#8
        CLR     SR_DATA
        SJMP    SR_RET

;       PROCESS DATA BITS

DATA_BIT:
        MOV     R0,SR_PTR
        MOV     A,@R0
        MOV     C,ACC.0
        MOV     SR_DATA,C
        RR      A
        MOV     @R0,A
        DJNZ    BIT_COUNT,SR_RET        ; COUNT 8 BITS
        MOV     SR_JUMP,#STOP_JUMP
        SJMP    SR_RET

;       CHECK STOP BIT FOR 1

STOP_BIT:
        MOV     R0,SR_PTR
        MOV     A,@R0
        SETB    SR_DATA
        ANL     A,#0C0H
        JZ      SR_STOP
        XRL     A,#0C0H
        JZ      SR_STOP
        INC     SR_PTR
        MOV     SR_JUMP,#START_JUMP
        SJMP    SR_RET

SR_STOP:
        MOV     SR_JUMP,#END_JUMP
        SJMP    SR_RET

SR_END:
        CLR     TR

SR_RET:
        POP     DPL
        POP     DPH
        POP     AR0
        POP     PSW
        POP     ACC
        RETI

;       TIMER I INTERRUPT

CSEG    AT      1BH
        AJMP    TIMER_I

RSEG    ASMCODE

TIMER_I:
        JNB     TILT_HI,TIMER_I_1
```

```
            SETB    TILT_LO
            CLR     TILT_HI
            SJMP    TIMER_I_2

TIMER_I_1:
            SETB    TILT_HI
            CLR     TILT_LO

TIMER_I_2:
            SETB    TIMER_FLAG
            SETB    CLRTI
            RETI

;*********************************************************************
;       PLM CALLABLE ASSEMBLY LANGUAGE ROUTINES
;
;*********************************************************************
;***************** PLM ROUTINE INTERFACE REGISTERS ******************

RSEG    ASMREGS

?READ_ADC0834?BYTE:             ; 1 BYTE DATA
?SCAN_KEYS?BYTE:                ; 1 BYTE ADDRESS POINTER
?COMPARE_KEYS?BYTE:             ; 2 BYTES OF ADDRESS POINTERS
?ONE_RELEASED?BYTE:             ; 2 BYTES OF ADDRESS POINTERS
?KEY_ADDED?BYTE:                ; 2 BYTES OF ADDRESS POINTERS
?CLEAR_KEYS?BYTE:               ; 1 BYTE ADDRESS POINTER
?MOVE_KEYS?BYTE:                ; 2 BYTES OF ADDRESS POINTERS
?MOUSE_PRESSED?BYTE:            ; 1 BYTE OF ADDRESS
?NO_KEYS_DOWN?BYTE:             ; 1 BYTE OF ADDRESS

ADC_ADDR:
KEY_ADDR:
KEY_ADDR_0:
DEST_KEY_ADDR:
NEW_KEY_ADDR:
            DS      1

KEY_ADDR_1:
SRC_KEY_ADDR:
OLD_KEY_ADDR:
            DS      1

RSEG    ASMCODE

;***************** READ ADC0834 FOUR CHANNEL ATOD ******************
;                                                                  *
;       CALLING SEQUENCE  ---  RETURNS BYTE                        *
;                                                                  *
;       X = READ_ADC0834(ADC_ADDR)                                 *
;                                                                  *
;*******************************************************************

;       I/O CONTROL BITS

ADCCS   BIT     P1.5
ADCCLK  BIT     P1.6
ADCDATA BIT     P1.7

READ_ADC0834:

MOV     A,ADC_ADDR
            SWAP    A
            CLR     ADCCLK
            CLR     ADCCS
            MOV     R0,#4
```

```
ADDRLP:
        RLC     A
        MOV     ADCDATA,C
        SETB    ADCCLK
        CLR     ADCCLK
        DJNZ    R0,ADDRLP
        MOV     R0,#8
        SETB    ADCCLK
        SETB    ADCDATA
ADCLP:
        CLR     ADCCLK
        MOV     C,ADCDATA
        SETB    ADCCLK
        RLC     A
        DJNZ    R0,ADCLP
        SETB    ADCCLK
        SETB    ADCCS
        RET

;************************* SCAN KEYBOARD **************************
;                                                                  *
;       CALLING SEQUENCE   --- RETURNS WORD                        *
;                                                                  *
;       CALL SCAN_KEYS(KEY_ADDR)                                   *
;                                                                  *
;       DATA IS LOADED IS READ FROM SCAN INTO KEY_ADDR AS:         *
;                                                                  *
;       BIT              7  6  5  4  3  2  1  0                    *
;       KEY_ADDR(0)     |CL|2L|2M|2R|NM|1L|1M|1R|                  *
;       KEY_ADDR(1)     |SH|4L|4M|4R|AL|3L|3M|3R|                  *
;       KEY_ADDR(2)     | 0| 0| 0| 0| 0| 0|MO|FN|                  *
;                                                                  *
;       DATA IS LOADED AT EXIT INTO KEY_ADDR AFTER SORT AS:        *
;                                                                  *
;       BIT              7  6  5  4  3  2  1  0                    *
;       KEY_ADDR(0)     | 0| 0|2L|2M|2R|1L|1M|1R|                  *
;       KEY_ADDR(1)     | 0| 0|4L|4M|4R|3L|3M|3R|                  *
;       KEY_ADDR(2)     | 0| 0|MO|AL|CL|FN|NM|SH|                  *
;                                                                  *
;******************************************************************
;       CONSTANT DEFINITIONS FOR KEY BOARD SCAN

COL0            BIT     P3.0
COL1            BIT     P3.1
COL2            BIT     P3.2
COL3            BIT     P3.3
FUNC_KEY        BIT     P1.0
MOUSE_KEY       BIT     P1.1

SCAN_KEYS:
        MOV     R0,KEY_ADDR
        CLR     COL0
        MOV     A,P3
        MOV     P3,#0
        MOV     P3,#0FFH
        CPL     A
        MOV     @R0,A
        CLR     COL1
        MOV     A,P3
        MOV     P3,#0
        MOV     P3,#0FFH
        CPL     A
        SWAP    A
        XCHD    A,@R0
        MOV     A,@R0
        SWAP    A
        MOV     @R0,A
```

```
        INC     R0
        CLR     COL2
        MOV     A,P3
        MOV     P3,#0
        MOV     P3,#0FFH
        CPL     A
        MOV     @R0,A
        CLR     COL3
        MOV     A,P3
        MOV     P3,#0
        MOV     P3,#0FFH
        CPL     A
        SWAP    A
        XCHD    A,@R0
        MOV     A,@R0
        SWAP    A
        MOV     @R0,A
        CLR     COL0
        CLR     A
        MOV     C,FUNC_KEY
        CPL     C
        MOV     ACC.2,C
        MOV     C,MOUSE_KEY
        SETB    COL0
        CPL     C
        MOV     ACC.5,C
        INC     R0
        MOV     @R0,A
        MOV     R1,AR0

;       SORT THE KEYS --- KEY_ADDR(0)

MOV     R0,KEY_ADDR
        MOV     A,@R0
        CLR     C
        RLC     A
        XCH     A,@R1
        MOV     ACC.3,C         ; CTL IN CY
        XCH     A,@R1
        CLR     C
        RR      A
        SWAP    A
        RLC     A
        XCH     A,@R1
        MOV     ACC.1,C         ; NUM IN CY
        XCH     A,@R1
        RR      A
        SWAP    A

;       PACK FINGER BITS --- KEY_ADDR(0)

MOV     @R0,#0
        XCHD    A,@R0
        RR      A
        ORL     A,@R0
        MOV     @R0,A

;       SORT FINGER BITS --- KEY_ADDR(1)

INC     R0
        MOV     A,@R0
        CLR     C
        RLC     A
        XCH     A,@R1
        MOV     ACC.0,C         ; SHFT IN CY
        XCH     A,@R1
        CLR     C
        RR      A
```

```
            SWAP    A
            RLC     A
            XCH     A,@R1
            MOV     ACC.4,C         ; ALT IN CY
            XCH     A,@R1
            RR      A
            SWAP    A

;           PACK FINGER BITS --- KEY_ADDR(1)

MOV     @R0,#0
            XCHD    A,@R0
            RR      A
            ORL     A,@R0
            MOV     @R0,A
            RET
```

```
;*************************** COMPARE KEY ARRAYS ************************
;                                                                      *
;       CALLING SEQUENCE   --- RETURNS BIT                             *
;                                                                      *
;       X = COMPARE_KEYS(KEY_ADDR_0,KEY_ADDR_1)                        *
;                                                                      *
;       IF KEYS ARE EQUAL THEN CY = TRUE ELSE CY = FALSE               *
;                                                                      *
;***********************************************************************

COMPARE_KEYS:

MOV     R0,KEY_ADDR_0
            MOV     R1,KEY_ADDR_1
            MOV     R2,#3
            CLR     C

COMP_LP:
            MOV     A,@R0
            XRL     A,@R1
            JNZ     COMP_RET
            INC     R0
            INC     R1
            DJNZ    R2,COMP_LP
            SETB    C

COMP_RET:
            RET
```

```
;*************************** MOVE KEY ARRAYS **************************
;                                                                      *
;       CALLING SEQUENCE                                               *
;                                                                      *
;       CALL MOVE_KEYS(DEST_KEY_ADDR,SRC_KEY_ADDR)                     *
;                                                                      *
;       AFTER EXECUTION @KEY_ADDR_0 = @KEY_ADDR_1                      *
;                                                                      *
;***********************************************************************

MOVE_KEYS:
            MOV     R0,DEST_KEY_ADDR
            MOV     R1,SRC_KEY_ADDR
            MOV     R2,#3

MOVE_LP:
            MOV     A,@R1
            MOV     @R0,A
            INC     R0
            INC     R1
```

```
        DJNZ    R2,MOVE_LP
        RET

;************************** TEST FOR ACTIVATE KEY ********************
;                                                                    *
;       CALLING SEQUENCE                                              *
;                                                                    *
;       X = ONE_RELEASED(NEW_KEY_ADDR_0,OLD_KEY_ADDR)                 *
;                                                                    *
;       IF @NEW_ADDR AND @OLD_ADDR DIFFER BY ONE BIT AND              *
;               THAT BIT IS SET IN @OLD_ADDR                          *
;         THEN CY = TRUE ELSE CY = FALSE                              *
;                                                                    *
;*********************************************************************

ONE_RELEASED:
        MOV     R0,NEW_KEY_ADDR
        MOV     R1,OLD_KEY_ADDR
        MOV     R2,#3
        MOV     R3,#1
        CLR     C

ACT_LP:
        MOV     A,@R0
        XRL     A,@R1
        JZ      ACT_1       ; IF BOTH THE SAME CHECK NEXT BYTE
        MOV     R4,A
        MOV     A,@R1
        XCH     A,R4

ACT_LP1:
        XCH     A,R4
        RR      A
        XCH     A,R4
        RR      A
        JNB     ACC.7,ACT_LP1

;       FOUND KEY THAT WAS DIFFERENT

CLR     ACC.7
        JNZ     ACT_RET_FALSE   ; IF NOT ONLY KEY THEN RETURN FALSE
        XCH     A,R4

JNB     ACC.7,ACT_RET_FALSE   ; WAS @OLD_ADDR KEY NOT SET
        DEC     R3

ACT_1:
        INC     R0
        INC     R1
        DJNZ    R2,ACT_LP       ; IF NOT DONE CHECK NEXT BYTE
        MOV     A,R3
        JNZ     ACT_RET_FALSE   ; IF MORE THAN ONE BYTE DIFFERENT THEN R3
<> 0
        SETB    C               ; ACTIVATE CONDITION MET
ACT_RET_FALSE:

RET

;************************** TEST FOR KEY DEPRESSED *******************
;                                                                    *
;       CALLING SEQUENCE                                              *
;                                                                    *
;       X = KEY_ADDED(NEW_KEY_ADDR_0,OLD_KEY_ADDR)                    *
;                                                                    *
;       IF @NEW_ADDR XRL @OLD_ADDR ARE DIFFERENT AND                  *
;               A BIT IS SET IN @NEW_ADDR                             *
;         THEN CY = TRUE ELSE CY = FALSE                              *
;                                                                    *
;*********************************************************************
```

```
KEY_ADDED:
        MOV     R0,NEW_KEY_ADDR
        MOV     R1,OLD_KEY_ADDR
        MOV     R2,#3
        CLR     C

ADDK_LP:
        MOV     A,@R0
        XRL     A,@R1
        JZ      ADDK_1      ; IF BOTH THE SAME CHECK NEXT BYTE
        MOV     R4,A
        MOV     A,@R0
        XCH     A,R4

ADDK_LP1:
        XCH     A,R4
        RR      A
        XCH     A,R4
        RR      A
        JNB     ACC.7,ADDK_LP1

;       FOUND KEY THAT WAS DIFFERENT

XCH     A,R4
        JNB     ACC.7,ADDK_RET_FALSE    ; WAS @OLD_ADDR KEY NOT SET
        SETB    C
        RET

ADDK_1:
        INC     R0
        INC     R1
        DJNZ    R2,ADDK_LP              ; IF NOT DONE CHECK NEXT BYTE

ADDK_RET_FALSE:

RET

;************************* CLEAR KEY REGISTER **********************
;                                                                   *
;       CALLING SEQUENCE                                             *
;                                                                   *
;       CALL CLEAR_KEYS(KEY_ADDR)                                    *
;                                                                   *
;********************************************************************

CLEAR_KEYS:
        MOV     R0,KEY_ADDR
        MOV     R1,#3
        CLR     A

CLR_LP: MOV     @R0,A
        INC     R0
        DJNZ    R1,CLR_LP
        RET

;******************** SETUP BUFFER FOR TRANSMISSION *****************
;                                                                   *
;       CALLING SEQUENCE                                             *
;                                                                   *
;       CALL SETUP_BUFFER                                            *
;                                                                   *
;       IF MOUSE KEY PRESSED THEN LOAD MOUSE INFORMATION             *
;       ALSO SETUP START AND END MARKS                               *
;                                                                   *
;********************************************************************
```

```
SETUP_BUFFER:

MOV     R0,#SR_BUF
        MOV     A,@R0
        ORL     A,#40H          ; START CODE
        MOV     @R0,A
        INC     R0
        MOV     A,@R0
        ORL     A,#80H          ; CONTINUATION CODE
        MOV     @R0,A
        INC     R0
        MOV     A,@R0
        ORL     A,#0C0H
        JNB     ACC.5,SET_BUF_RET

;       PLACE TILT DATA IN BUFFER

MOV     A,@R0
        ORL     A,#80H
        MOV     @R0,A
        INC     R0

;       LOAD UP/DOWN ADC COUNT   vert.

MOV     R7,UP_DN_ADC + 1
        MOV     R6,UP_DN_ADC
        ACALL   RRW
        ACALL   RRW
        ACALL   RRW
        MOV     A,R7
        ANL     A,#3FH
        ORL     A,#80H
        MOV     @R0,A
        INC     R0
        ACALL   RLW
        ACALL   RLW
        ANL     A,#7
        MOV     @R0,A

;       LOAD LT/RT ADC COUNT   horz.

MOV     R7,LT_RT_ADC + 1
        MOV     R6,LT_RT_ADC
        MOV     A,R7
        ANL     A,#0F8H          ; error - was #0FCh
        ORL     A,@R0
        ANL     A,#3FH
        ORL     A,#80H
        MOV     @R0,A
        INC     R0
        ACALL   RLW
        ACALL   RLW
        ORL     A,#0C0H

SET_BUF_RET:
        MOV     @R0,A
        RET

RLW:    CLR     C
        MOV     A,R7
        RLC     A
        MOV     R7,A
        MOV     A,R6
        RLC     A
        MOV     R6,A
        RET
```

```
RRW:    CLR     C
        MOV     A,R6
        RRC     A
        MOV     R6,A
        MOV     A,R7
        RRC     A
        MOV     R7,A
        RET
```

```
;******************** MOUSE KEY PRESSED ROUTINE ********************
;                                                                  *
;       CALLING SEQUENCE                                           *
;                                                                  *
;       X = MOUSE_PRESSED(KEY_ADDR) RETURN BIT                     *
;                                                                  *
;       IF MOUSE KEY PRESSED  RETURN TRUE ELSE RETURN FALSE        *
;       ALSO SETUP START AND END MARKS                             *
;                                                                  *
;*******************************************************************
```

```
MOUSE_PRESSED:

MOV     R0,KEY_ADDR
        INC     R0
        INC     R0
        MOV     A,@R0
        MOV     C,ACC.5
        RET
```

```
;******************** MOUSE KEY PRESSED ROUTINE ********************
;                                                                  *
;       CALLING SEQUENCE                                           *
;                                                                  *
;       X = NO_KEYS_DOWN(KEY_ADDR)   RETURN BIT                    *
;                                                                  *
;       IF NO_KEYS_DOWN THEN RETURN TRUE ELSE RETURN FALSE         *
;                                                                  *
;*******************************************************************
```

```
NO_KEYS_DOWN:
        MOV     R0,KEY_ADDR
        MOV     A,@R0
        INC     R0
        ORL     A,@R0
        INC     R0
        ORL     A,@R0
        SETB    C
        JZ      NOKEYEX
        CLR     C
NOKEYEX:
        RET

END
```

The software used by the computer to execute the functions described above (e.g., the look-up table) may comprise the following listings, which are written in TurboPascal for an IBM PC compatible computer, with a cable connection between the data input unit and the COM1, serial port of the computer.

```pascal
uses dos,rs232,globvars,crt;

(**************************************************************** var   exitcode : word;

(**************************************************************** begin
        keep(exitcode);
end.

unit globvars;

interface (****************************************************************)

type st4       = string[4];
     st25      = string[25];
     st45      = string[45];
     scan_type = array[1..2] of integer;
     str_type  = record
                    str : string[3];
                    s_o : array[1..3] of word;
                 end;

var  exitcode : word;
     time_out : boolean;
     ch       : char;
     i,j,k    : word;
     x,y      : integer;

const twiddler_table : array[1..255] of scan_type =
                 (($1E,$61),     {  1  -  a }
                  ($12,$65),     {  2  -  e }
                  ($39,$20),     {  3  -  space }
                  ($30,$62),     {  4  -  b }
                  ($33,$2C),     {  5  -  , }
                  ($13,$72),     {  6  -  r }
                  ($17,$69),     {  7  -  i }
                  ($21,$66),     {  8  -  f }
                  ($28,$27),     {  9  -  ' }
                  ($16,$75),     { 10  -  u }
                  ($26,$6C),     { 11  -  l }
                  ($0E,$08),     { 12  -  backspace }
                  ($35,$3F),     { 13  -  ? }
                  ($2D,$78),     { 14  -  x }
                  ($18,$6F),     { 15  -  o }
                  ($2E,$63),     { 16  -  c }
                  ($27,$3B),     { 17  -  ; }
                  ($1F,$73),     { 18  -  s }
                  ($24,$6A),     { 19  -  j }
                  ($00,$00),     { 20  -  the }
                  ($00,$00),     { 21 }
                  ($00,$00),     { 22 }
                  ($00,$00),     { 23 }
                  ($48,$00),     { 24  -  up arrow }
                  ($00,$00),     { 25 }
                  ($00,$00),     { 26 }
                  ($00,$00),     { 27 }
                  ($05,$24),     { 28  -  $ }
                  ($00,$00),     { 29 }
                  ($00,$00),     { 30 }
```

```
($00,$00),    { 31 }
($22,$67),    { 32 - g }
($28,$22),    { 33 - " }
($2F,$76),    { 34 - v }
($32,$6D),    { 35 - m }
($00,$00),    { 36 - of }
($00,$00),    { 37 }
($00,$00),    { 38 }
($00,$00),    { 39 }
($4B,$00),    { 40 - left arrow }
($00,$00),    { 41 }
($00,$00),    { 42 - left tab (shift tab) }
($00,$00),    { 43 }
($00,$00),    { 44 }
($00,$00),    { 45 }
($00,$00),    { 46 }
($00,$00),    { 47 }
($53,$00),    { 48 - delete }
($02,$21),    { 49 - ! }
($15,$79),    { 50 - y }
($19,$70),    { 51 - p }
($0B,$29),    { 52 - ) }
($00,$00),    { 53 }
($00,$00),    { 54 }
($00,$00),    { 55 }
($50,$00),    { 56 - down arrow }
($00,$00),    { 57 }
($00,$00),    { 58 }
($00,$00),    { 59 }
($0A,$28),    { 60 - ( }
($00,$00),    { 61 }
($00,$00),    { 62 }
($00,$00),    { 63 }
($20,$64),    { 64 - d }
($34,$2E),    { 65 - . }
($14,$74),    { 66 - t }
($25,$6B),    { 67 - k }
($00,$00),    { 68 - to }
($00,$00),    { 69 }
($00,$00),    { 70 }
($00,$00),    { 71 }
($00,$00),    { 72 - ed }
($00,$00),    { 73 }
($00,$00),    { 74 }
($00,$00),    { 75 }
($00,$00),    { 76 }
($00,$00),    { 77 }
($00,$00),    { 78 }
($00,$00),    { 79 }
($49,$00),    { 80 - pg up }
($00,$00),    { 81 }
($00,$00),    { 82 }
($00,$00),    { 83 }
($47,$00),    { 84 - home }
($00,$00),    { 85 }
($00,$00),    { 86 }
($00,$00),    { 87 }
($00,$00),    { 88 }
($00,$00),    { 89 }
($00,$00),    { 90 }
($00,$00),    { 91 }
($00,$00),    { 92 }
($00,$00),    { 93 }
($00,$00),    { 94 }
($00,$00),    { 95 }
($0D,$3D),    { 96 - = }
($00,$00),    { 97 }
($00,$00),    { 98 }
($00,$00),    { 99 }
```

```
($00,$00),    { 100 }
($00,$00),    { 101 }
($00,$00),    { 102 }
($00,$00),    { 103 }
($00,$00),    { 104 }
($00,$00),    { 105 }
($00,$00),    { 106 }
($00,$00),    { 107 }
($00,$00),    { 108 }
($00,$00),    { 109 }
($00,$00),    { 110 }
($00,$00),    { 111 }
($03,$40),    { 112 - @ }
($00,$00),    { 113 }
($00,$00),    { 114 }
($00,$00),    { 115 }
($00,$00),    { 116 }
($00,$00),    { 117 }
($00,$00),    { 118 }
($00,$00),    { 119 }
($00,$00),    { 120 }
($00,$00),    { 121 }
($00,$00),    { 122 }
($00,$00),    { 123 }
($00,$00),    { 124 }
($00,$00),    { 125 }
($00,$00),    { 126 }
($00,$00),    { 127 }
($23,$68),    { 128 - h }
($00,$00),    { 129 - and }
($11,$77),    { 130 - w }
($31,$6E),    { 131 - n }
($00,$00),    { 132 - in }
($00,$00),    { 133 }
($00,$00),    { 134 }
($00,$00),    { 135 }
($4D,$00),    { 136 - right arrow }
($00,$00),    { 137 }
($0F,$09),    { 138 - tab (right tab) }
($00,$00),    { 139 }
($00,$00),    { 140 - ion }
($00,$00),    { 141 }
($00,$00),    { 142 }
($00,$00),    { 143 }
($06,$25),    { 144 - % }
($00,$00),    { 145 }
($00,$00),    { 146 }
($00,$00),    { 147 }
($00,$00),    { 148 }
($00,$00),    { 149 }
($00,$00),    { 150 }
($00,$00),    { 151 }
($00,$00),    { 152 }
($00,$00),    { 153 }
($00,$00),    { 154 }
($00,$00),    { 155 }
($00,$00),    { 156 }
($00,$00),    { 157 }
($00,$00),    { 158 }
($00,$00),    { 159 }
($00,$00),    { 160 - ing }
($00,$00),    { 161 }
($00,$00),    { 162 }
($00,$00),    { 163 }
($00,$00),    { 164 }
($00,$00),    { 165 }
($00,$00),    { 166 }
($00,$00),    { 167 }
```

```
($00,$00),    { 168 }
($00,$00),    { 169 }
($00,$00),    { 170 }
($00,$00),    { 171 }
($00,$00),    { 172 }
($00,$00),    { 173 }
($00,$00),    { 174 }
($00,$00),    { 175 }
($09,$2A),    { 176  -  * }
($00,$00),    { 177 }
($00,$00),    { 178 }
($00,$00),    { 179 }
($00,$00),    { 180 }
($00,$00),    { 181 }
($00,$00),    { 182 }
($00,$00),    { 183 }
($00,$00),    { 184 }
($00,$00),    { 185 }
($00,$00),    { 186 }
($00,$00),    { 187 }
($00,$00),    { 188 }
($00,$00),    { 189 }
($00,$00),    { 190 }
($00,$00),    { 191 }
($1C,$0D),    { 192  -  "enter " }
($0C,$2D),    { 193  -  - (hyphen) }
($2C,$7A),    { 194  -  z }
($10,$71),    { 195  -  q }
($0C,$5F),    { 196  -  _ }
($00,$00),    { 197 }
($00,$00),    { 198 }
($00,$00),    { 199 }
($04,$23),    { 200  -  # }
($00,$00),    { 201 }
($00,$00),    { 202 }
($00,$00),    { 203 }
($08,$26),    { 204  -  & }
($00,$00),    { 205 }
($00,$00),    { 206 }
($00,$00),    { 207 }
($27,$3A),    { 208  -  : }
($00,$00),    { 209 }
($00,$00),    { 210 }
($00,$00),    { 211 }
($00,$00),    { 212 }
($00,$00),    { 213 }
($00,$00),    { 214 }
($00,$00),    { 215 }
($00,$00),    { 216 }
($00,$00),    { 217 }
($00,$00),    { 218 }
($00,$00),    { 219 }
($00,$00),    { 220 }
($00,$00),    { 221 }
($00,$00),    { 222 }
($00,$00),    { 223 }
($0D,$2B),    { 224  -  + }
($00,$00),    { 225 }
($00,$00),    { 226 }
($00,$00),    { 227 }
($00,$00),    { 228 }
($00,$00),    { 229 }
($00,$00),    { 230 }
($00,$00),    { 231 }
($00,$00),    { 232 }
($00,$00),    { 233 }
($00,$00),    { 234 }
($00,$00),    { 235 }
```

```
($00,$00),    { 236 }
($00,$00),    { 237 }
($00,$00),    { 238 }
($00,$00),    { 239 }
($51,$00),    { 240  -  pg dn }
($00,$00),    { 241 }
($00,$00),    { 242 }
($00,$00),    { 243 }
($00,$00),    { 244 }
($00,$00),    { 245 }
($00,$00),    { 246 }
```

```
                    ($00,$00),    { 247 }
                    ($00,$00),    { 248 }
                    ($00,$00),    { 249 }
                    ($00,$00),    { 250 }
                    ($00,$00),    { 251 }
                    ($4F,$00),    { 252 - end }
                    ($00,$00),    { 253 }
                    ($00,$00),    { 254 }
                    ($00,$00));   { 255 } string_table : array[1..8] of str_type =
                ((str:'the'; s_o:(66,128,2)),
                 (str:'of' ; s_o:(15,8,0)),
                 (str:'to' ; s_o:(66,15,0)),
                 (str:'ed' ; s_o:(2,64,0)),
                 (str:'and'; s_o:(1,131,64)),
                 (str:'in '; s_o:(7,131,0)),
                 (str:'ion'; s_o:(7,15,131)),
                 (str:'ing'; s_o:(7,131,32)));

implementation
(******************************************************************)
begin
end.

unit rs232;

interface uses dos,globvars,crt;

(******************************************************************)

procedure reset_comm_intr(com : word);

(******************************************************************)

const
    max_com = 2;
    com1    = 1;
    com2    = 2;
    null    = #0;
    max_str = 3;

up_arrow    : word = 24;
    down_arrow  : word = 56;
    right_arrow : word = 136;
    left_arrow  : word = 40;

type str3 = string[3];

char_ptr_type = ^char;

com_rec = record
                port_addr  : word;
                xmit       : boolean;
                msg_in     : boolean;
                in_buf     : char;
                out_buf    : char;
                old_com    : pointer;
                intr_num   : word;
                intr_hndlr : pointer;
                br         : word;
                parity     : char;
                bits       : integer;
              end;
```

```
const
    comm1           = $3F8;
    comm2           = $2F8;
    repeat_rate     = 5;

_8259A_STAT     = $20;
    _8259A_MASK     = $21;
    com1_en_mask    = $0EF;
    com2_en_mask    = $0F7;
    comm_en_mask    : array[1..2] of word = (com1_en_mask,com2_en_mask);
    comm_dis_mask   = $10;
    read_irr        = $0A;
    read_isr        = $0B;

{Rs-232 port addresses}

Rsintr      = $01;          {Intr enable register offset}
      EIDAV     = $01;          {EI for data available}
      EITXE     = $02;          {EI for transmitter holding resister empty}
      EIRXLS    = $04;          {EI for receive line status}
      EIMST     = $08;          {EI for modem status}
    RsIIr       = $02;          {Cause of interrupt offset}
    RsCtl       = $03;          {Mode control register offset}
      XBITS     = $03;          {Number of data bits
                                        0 = 5
                                        1 = 6
                                        2 = 7
                                        3 = 8 }
      XSTOP     = $04;          {Number of STOP bits -- 0=1 ; 1=2}
      PAREN     = $08;          {Parity enable}
      PAREV     = $10;          {Parity even}
      PARSTK    = $20;          {Parity stuck}
      SETBRK    = $40;          {Set break}
      DVLA      = $80;          {Divisor latch access}
    Rsmodem     = $04;          {Modem control outputs offset}
      DTR       = $01;          {Set DTR output}
      RTS       = $02;          {Set RTS output}
      cout1     = $04;
      cout2     = $08;
      loop      = $10;          {enable loop back}

Rslstat     = $05;          {Line status inputs offset}
      DATRDY    = $01;          {Data ready to be read}
      OVRERR    = $02;          {Overrun error}
      PARERR    = $04;          {Parity error}
      FRMERR    = $08;          {Frame error}
      RXERRS    = $0E;          {Error bits}
      BRKINT    = $10;          {Break received}
      TXHREM    = $20;          {Transmitter holding register empty}
      TXSREM    = $40;          {Transmitter shift register empty}
      TXSTAT    = $60;          {Transmitter status bits}
    RsMstat     = $06;          {Modem status inputs offset}
      CTS       = $10;          {Clear to send}
      DSR       = $20;          {Data set ready}

{Baud_rate generator}
      BR384     =   3;          {38400 baud }
      BR192     =   6;          {19200 baud }
      BR96      =  12;          { 9600 baud }
      BR48      =  24;          { 4800 baud }
      BR24      =  48;          { 2400 baud }
      BR12      =  96;          { 1200 baud }
      BR06      = 192;          {  600 baud } var
    old_com1,old_com2   : pointer;
    new_cptr            : pointer;
```

```
    old_intr_mask          : byte;
    old_timer_ptr          : pointer;
    regs                   : registers;
    com_num                : word;
    mychar                 : char;
    ch1,ch2,ch3            : char;
    head_ptr               : word absolute $0040:$001A;
    tail_ptr               : word absolute $0040:$001C;
    kbdstat                : byte absolute $0040:$0017;
    head,tail              : ^word;
    txd_comp               : boolean;
    clear_key              : boolean;
    first_pressed          : boolean;
    shift_stat             : boolean;
    num_stat               : boolean;
    rxd                    : array [1..6] of byte;
    speed                  : array [1..8] of word;
    rxd_index              : byte;
    scan_offset            : word;
    repeat_offset          : word;
    bin_scan               : word;
    horz,vert              : integer;
    horz_mean,
    vert_mean              : integer;
    h_indx,v_indx          : integer;
    h_avg,v_avg            : array[1..3] of integer;
    rel_x,rel_y            : integer;
    old_vert,
    old_horz               : integer;
    d_vert,d_horz          : integer;
    m_vert,m_horz          : integer;
    repeat_char            : boolean;
    repeat_delay           : boolean;
    beep                   : boolean;
    char_displayed         : boolean;
    direction              : integer;
    last_direction         : integer;
    timer                  : integer;
    d_v_sum,
    d_h_sum,
    t_vert,
    t_horz                 : integer;
    x_speed,y_speed        : word;

const
    com_port               : array[1..max_com] of com_rec =
                             (( port_addr : comm1;
                                xmit      : false;
                                msg_in    : false;
                                in_buf    : NULL;
                                out_buf   : NULL;
                                old_com   : pointer(0);
                                intr_num  : 12;
                                intr_hndlr: pointer(0);
                                br        : BR24;
                                parity    : 'N';
                                bits      : 8),
                              ( port_addr : comm2;
                                xmit      : false;
                                msg_in    : false;
                                in_buf    : NULL;
                                out_buf   : NULL;
                                old_com   : pointer(0);
                                intr_num  : 11;
                                intr_hndlr: pointer(0);
                                br        : BR24;
                                parity    : 'N';
                                bits      : 8));
```

```pascal
implementation
(******************************************************************)
procedure cursor(start, last : integer);

var regs : registers;

begin
      regs.ax := $100;
      regs.cx := $100 + start + last;
      intr($10,regs);
end;
(******************************************************************)
procedure put_in_keyboard_buffer(offset : word);

var twd_tbl : array[1..2] of integer;
    valid_char : boolean;

begin
      valid_char := true;
      if num_stat then
         begin
            if twiddler_table[offset,2] in [$61..$6A] then
               twd_tbl[2] := twiddler_table[offset,2] - $31
            else valid_char := false;
            if twd_tbl[2] = $30 then twd_tbl[1] := $0B
               else twd_tbl[1] := twd_tbl[2] - $2F;
         end
      else
         begin
            if shift_stat then
               begin
                  if twiddler_table[offset,2] in [$61..$7A] then
                     twd_tbl[2] := twiddler_table[offset,2] - $20
                  else valid_char := false;
               end
            else twd_tbl[2] := twiddler_table[offset,2];
            twd_tbl[1] := twiddler_table[offset,1];
         end;

if valid_char then
         begin
            if ((head_ptr - 2) <> tail_ptr) or
               ((head_ptr = $1E) and (tail_ptr <> $3C)) then
               begin
                  tail := ptr(seg(tail_ptr),tail_ptr);
                  tail^ := (word(twd_tbl[1]) shl 8) or twd_tbl[2];
                  inc(tail_ptr,2);
                  if tail_ptr > $3C then tail_ptr := $1E;
               end
            else
               begin
                  sound(100);
                     timer := 0;
                  beep := true;
               end;
         end;
end;
(******************************************************************)
procedure decode_rxd;

const
      weight : array[1..12] of word =
               (1,2,3,4,8,12,16,32,48,64,128,192);

mask   : array[1..12] of word =
               ($0001,$0002,$0004,$0008,
                $0010,$0020,$0040,$0080,
                $0100,$0200,$0400,$0800);
```

```
begin
    scan_offset := 0;
    bin_scan := (word(rxd[2] and $3f) shl 6) or (word(rxd[1] and $3f));
    for i := 1 to 12 do
        begin
            scan_offset := scan_offset + (((bin_scan and mask[i]) shr
(i-1))
                                            * weight[i]);
        end;
    if scan_offset in [1..255] then
        repeat_offset := scan_offset
    else
        begin
          repeat_offset := 111;
          scan_offset   := repeat_offset;
        end;
end;
(***************************************************************)
procedure display_string(str : str3);

var  scan : word;

begin
    for i := 1 to 8 do
        begin
          if str = string_table[i].str then
              for j := 1 to length(str) do
                  put_in_keyboard_buffer(string_table[i].s_o[j]);
        end;
end;
(***************************************************************)
function string_sequence : boolean;

var ret_stat : boolean;

begin
    ret_stat := true;
    case scan_offset of
         20  : display_string('the');
         36  : display_string('of');
         68  : display_string('to');
         72  : display_string('ed');
         129 : display_string('and');
         132 : display_string('in');
         140 : display_string('ion');
         160 : display_string('ing');
         else ret_stat := false;
       end;

string_sequence := ret_stat;
end;
(***************************************************************)
procedure decode_special_keys;

begin
    case rxd[rxd_index] of
        $C0 : begin                         { no special key pressed }
                shift_stat := false;
                num_stat := false;
              end;
        $C1 : begin                         { shift key pressed }
                shift_stat := true;
                num_stat := false;
              end;
        $C2 : begin                         { num key pressed }
                num_stat := true;
                shift_stat := false;
              end;
```

```pascal
        $C8 : begin                              { turn cursor to block for demo }
                 cursor(0,7);
                 shift_stat := false;
                 num_stat := false;
              end;
        else                                     { any other special keypressed }
              begin
                 shift_stat := false;
                 num_stat := false;
              end;
      end;
end;
(*****************************************************************)
function median(v_1,v_2,v_3 : integer) : integer;

var tmp_var : integer;

begin
      tmp_var := v_2;
      if tmp_var > v_3 then tmp_var := v_3;
      if tmp_var < v_1 then tmp_var := v_1;
      median := tmp_var;
end;
(*****************************************************************)
procedure cursor_demo;

begin vert := (integer(rxd[5] and $07) shl 6) or
              (integer(rxd[4] and $3f)) - 256;
      horz := ((integer(rxd[5] and $38) shr 3) or
              (integer(rxd[6] and $3f) shl 3)) - 256;

x := (horz div 2)+40;
      y := (-vert div 4)+12;

if x > 80 then x := 80;
      if x < 1 then x := 1;
      if y > 25 then y := 25;
      if y < 1 then y := 1;

gotoxy(x,y);
end;
(*****************************************************************)
procedure text_mouse;

const db       : integer = 10;   { deadband }
      x_gain   : integer = 2;
      y_gain   : integer = 2;

var   a_1,a_2  : word;
      x_counts,
      y_counts : integer;

begin vert := (integer(rxd[5] and $07) shl 6) or
              (integer(rxd[4] and $3f)) - 256;
      horz := ((integer(rxd[5] and $38) shr 3) or
              (integer(rxd[6] and $3f) shl 3)) - 256;
      if abs(vert) > 100 then vert := (vert div abs(vert)) * 100;
      if abs(horz) > 100 then horz := (horz div abs(horz)) * 100;

if first_pressed then
         begin
            old_horz := horz;
            old_vert := vert;
            d_v_sum := 0;
```

```
            d_h_sum := 0;
            first_pressed := false;
        end;

d_vert := old_vert - vert;
    d_horz := old_horz - horz;

t_vert := d_vert;
    t_horz := d_horz;

old_vert := vert;
    old_horz := horz;

if (abs(d_h_sum) > abs(d_horz)) then t_horz := d_h_sum;

if (abs(t_horz) >= db) then
        begin
            x_counts := ((abs(t_horz) * x_gain) div 10) - 1;
            if t_horz >= 0 then a_1 := left_arrow
            else a_1 := right_arrow;
            for i := 1 to x_counts do
                put_in_keyboard_buffer(a_1);
            d_h_sum := 0;
        end
        else d_h_sum := d_h_sum + (d_horz div 2);

if (abs(d_v_sum) > abs(d_vert)) then t_vert := d_v_sum;

if (abs(t_vert) >= db) then
        begin
            y_counts := ((abs(t_vert) * y_gain) div 10) - 1;
            if t_vert >= 0 then a_2 := down_arrow
            else a_2 := up_arrow;
            for i := 1 to y_counts do
                put_in_keyboard_buffer(a_2);
            d_v_sum := 0;
        end
        else d_v_sum := d_v_sum + (d_vert div 2);

end;
(****************************************************************)
procedure   repeat_timer_intr(FLAGS,CS,IP,AX,BX,CX,DX,SI,DI,DS,ES,DP  :
word);

interrupt;

var  regs : registers;

begin
        inc(timer);
  if beep then
     begin
            if timer > 3 then
                begin
                    nosound;
                beep := false;
                end;
     end
       else
        if timer > 1 then
           begin
               if repeat_delay and (timer > repeat_rate) then
                  repeat_delay := false;
               if not repeat_delay then
                   begin
                       if repeat_char then
                           begin
                               put_in_keyboard_buffer(repeat_offset);
```

```
                    char_displayed := true;
                 end;
              timer := 0;
           end;
        end;
end;
(*****************************************************************)
procedure init_repeat_timer_intr;

begin
     setintvec($1c,@repeat_timer_intr);
end;
(*****************************************************************)
procedure reset_repeat_timer_intr;

begin
     setintvec($1c,old_timer_ptr);
end;
(*****************************************************************)
procedure com1_intr(FLAGS,CS,IP,AX,BX,CX,DX,SI,DI,DS,ES,DP : word);

interrupt;

var regs    : registers;
    rs_lstat : byte;

begin
     with com_port[1] do
     begin
     rs_lstat := port[port_addr + rslstat];
     case port[port_addr + rsiir] of
         4 : begin
               inc(rxd_index);
               rxd[rxd_index] := port[port_addr];

if (((rxd[rxd_index] and $c0) = 0)
                  or (rxd[rxd_index] >= $c0))
                  or (rxd[rxd_index] <= $0d) then
                      txd_comp := true;

case rxd[rxd_index] of
                   $0a : begin
                             repeat_char := false;
                             if not char_displayed then
                                 put_in_keyboard_buffer(repeat_offset)
                             else char_displayed := false;
                         end;
                   $0c : begin
                             last_direction := 0;
                             first_pressed := true;
                         end;
                   $0d : begin
                             repeat_char := true;
                             repeat_delay := true;
                             timer := 0;
                             char_displayed := false;
                         end;
               end;

if txd_comp then
                   begin
                     if rxd_index = 3 then
                         begin
                           decode_special_keys;
                           decode_rxd;
                           if not string_sequence then
                               put_in_keyboard_buffer(scan_offset);
                         end;
```

```pascal
                        if rxd_index = 6 then
                            begin
                                decode_rxd;
                                if scan_offset <> 1 then
                                    text_mouse;
                            end;
                        rxd_index := 0;
                        txd_comp := false;
                    end;
            end;
                6 :  writeln('RS232 Communications Error ',port_addr);
        end;
        port[_8259A_STAT] := $20;   { send eoi }
    end;
end;
(******************************************************************)
procedure set_rs(com : word;br : word;bits : integer;par : char);

var   pen,pev,pst : integer;

begin with com_port[com] do
        begin
            port[port_addr + RsCtl] := DVLA;
            port[port_addr] := lo(Br);
            port[port_addr + Rsintr] := hi(Br);
            case upcase(par) of
                'N' :  begin
                            pen := 0;
                                pev := 0;
                    pst := 0;
                        end;
                'E' :  begin
                    pen := PAREN;
                    pev := PAREV;
                                pst := 0;
                    end;
                'O' :  begin
                    pen := PAREN;
                                pev := 0;
                                pst := 0;
                    end;
            end;
            port[port_addr + RsCtl] := ((Bits-5) and 3) or
                                        Pen or Pev or Pst or 4;
            port[port_addr + Rsintr] := 0;
            ch := chr(port[port_addr]);
    end;
end;
(******************************************************************)
procedure init_comm_intr(com : word);

var   tmp_byte : byte;
      num : integer;

begin
      port[_8259A_MASK] := 0;               (* enable all interupts *)

with com_port[com] do
          begin
            intr_hndlr := @com1_intr;
            getintvec(intr_num,old_com);
            setintvec(intr_num,intr_hndlr);
            set_rs(com,br,bits,parity);
            port[port_addr + rsintr] := eidav;
            port[port_addr + rsmodem] := cout2 or dtr or rts;
            repeat
```

```
            until (port[port_addr + rsintr] and eitxe = 0);
            port[port_addr + rsintr] := port[port_addr + rsintr] and not
eidav;

tmp_byte := port[port_addr];
            for i := 1 to 100 do ;
            tmp_byte := port[port_addr];
            port[port_addr + rsintr] := port[port_addr + rsintr] or eidav;
            ch := chr(port[port_addr + rslstat]);
        end;
end;
(****************************************************************)
procedure reset_comm_intr(com : word);

begin
    with com_port[com] do
        begin
            setintvec(intr_num,old_com);
            regs.flags := regs.flags and not($200);
            port[port_addr + rsmodem] := 0;
        end;
end;
(****************************************************************)
begin
    init_comm_intr(com1);
    init_repeat_timer_intr;
    txd_comp := false;
    repeat_char := false;
    shift_stat := false;
    clear_key := true;
    last_direction := 0;
    rxd_index := 0;
    h_indx := 0;
    v_indx := 0;
    timer := 0;
    first_pressed := true;
    d_v_sum := 0;
    d_h_sum := 0;
    beep := false;
end.
```

It should be noted that this program is a terminate stay resident program which is co-resident with other programs. The listings include a key assignment table similar to that set forth above but which is a subset of that described in the table excluding the F1, F2 functions. As will be noted, the key assignment table contains ASCII characters represented by hexidecimal code.

The principles, preferred embodiments and modes of operation of the present invention have been described in the foregoing specification. The invention which is intended to be protected herein should not, however, be construed as limited to the particular teachings of the specification because they merely illustrate the invention defined in the following claims.

What is claimed is:

1. A data input device for interfacing with a computer, comprising:
   an ergonomically designed handle that can be operated by a hand of a user by curling the fingers of the hand around the handle and pressing keys with the tips of the fingers;
   a chord keyboard integral with the handle for generating character data, the chord keyboard being mounted on the handle so that input data for the computer can be generated when the fingers of the user's hand are curled around the handle, the chord keyboard including a first keypad mounted on the handle and located adjacent the four fingers of the hand of the user when the fingers are curled around the handle to type;
   a second keypad mounted on the handle and located adjacent the thumb of the user when the thumb is curled around the handle to type; and
   a support band adapted to fit around the hand of the user, the band being attached to the handle for pressing the handle into the palm of the hand of the user so the device may be held in the hand without the hand gripping the device without other means of support and operated by depressing and releasing the keys with the tips of the fingers of the hand supporting the device,
   wherein the handle has a left-right symmetry and the first and second keypads are arranged on the handle with a left-right symmetry and the support band can support either the left or right hand so that the data input device can be operated by either the right hand or left hand of the user.

2. The data input device as recited in claim 1, wherein the handle further comprises a microprocessor for generating the input data.

3. A data input device as recited in claim 2, wherein the computer includes a look-up table in which is stored character information correlated to the chords, wherein the computer reads character information from said lookup table based on the input data generated by the microprocessor.

4. A data input device as recited in claim 3, wherein:
the first keypad comprises an array of individual keys in rows and columns; and
wherein the look-up table provides an assignment of the characters to the keys and chords on the first keypad in alphabetical order.

5. A data input device as recited in claim 1, wherein the handle further comprises a display for generating visual symbols corresponding to information received by the data input device from the computer.

6. A data input device as recited in claim 2, further comprising a sensor coupled to the microprocessor for generating pointer position information for the computer.

7. The data input device of claim 6 wherein said sensor comprises a tilt sensor.

8. The data input device as recited in claim 6 wherein said sensor comprises a plurality of angular accelerometers.

9. The data input device of claim 1, wherein said support band is adjustable in length and in angular position with respect to a circumference of the ergonomically designed handle to custom fit the grip of the device to the size of the hand of the user.

10. A data input device, having a plurality of keys, for interfacing with a computer, comprising:
an ergonomically designed handle that can be operated by a hand of a user by curling the fingers of the hand around the handle and depressing and releasing the keys with the tips of the fingers;
a chord keyboard integral with the handle for generating input data for the computer, the chord keyboard being integral with the handle and mounted so that the input data can be generated when the fingers of the hand are curled around the handle and the keys are depressed and released,
wherein the handle has a left-right symmetry and the keys of the chord keyboard are arranged with left-right symmetry on the handle, so that the data input device can be operated by either the right or left hand of the user.

11. A data input device as recited in claim 8, wherein the chord keyboard further comprises:
a first keypad including a plurality of keys mounted on the handle at a location adjacent where the four fingers of the hand of the user curl around to operate by pressing and releasing; and
a second keypad including a plurality of keys mounted on the handle at a location adjacent where the thumb of the user curls around the handle to operate by pressing and releasing; and
wherein the handle further comprises,
a first set of labels for indicating which keys on the first keypad will generate a given character; and
a second set of labels identifying keys on the second keypad.

12. A data input device as recited in claim 11 wherein the labels of said first and second sets of labels are embossed on the handle of the data input device.

13. The data input device of claim 9 wherein said first and second set of labels comprise templates.

14. A data input device as recited in claim 10 wherein the keys of the chord keyboard are of such number and arrangement that any of a plurality of keys is accessible to and can be pressed and released by each of the five digits of the hand.

15. A data input device as recited in claim 10 wherein the ergonomically designed handle comprises a plurality of keypads, all of the keys of which may be released without any contact required between keystrokes.

16. A data input device as recited in claim 10 wherein the ergonomically designed handle further comprises an adjustable support and adjustment band traversing the back of the operating hand.

17. A support and adjustment band as recited in claim 16 wherein the band is attached to the handle so as to press the handle into the palm of the operating hand without the user having to grip the handle.

18. A support and adjustment band as recited in claim 16 wherein the band is adjustable in both length and orientation to fit the hands of different users.

19. A data input device as recited in claim 10 wherein the chord keyboard further comprises keypads having keys with labels which are visible to the user between keystrokes during normal operating use.

20. A data input device as recited in claim 10, further comprising a microprocessor coupled to the keyboard for generating the input data for the computer.

21. A data input device as recited in claim 20, wherein a look-up table stores character information correlated to the chord, wherein the computer reads character information from said look-up table generated by the keyboard based on the input data generated by the microprocessor.

22. A data input device as recited in claim 21, wherein:
the first keypad includes an array of individual keys in rows and columns; and
wherein the look-up table provides an assignment of the characters to the keys and chords on the first keypad in alphabetical order.

23. A data input device as recited in claim 20, further comprising a sensor coupled to the microprocessor for generating pointer position information for the computer.

24. The data input device of claim 23 wherein said sensor comprises a tilt sensor.

25. The data input device as recited in claim 23 wherein said sensor comprises a plurality of angular accelerometers.

26. A data input device as recited in claim 10, further comprising a display for generating visual symbols corresponding to information received by the data input device from the computer.

27. The cybernetic interface of claim 28, wherein said support band is adjustable in length and angular position with respect to a circumference of said ergonomically designed handle to custom fit the grip of the device to the hand of the user.

28. A cybernetic interface for use with a computer, comprising:
an ergonomically designed handle, adapted to be operated by a hand of a user;
a chord keyboard integral with the handle for generating input data for the computer;
a support and adjustment band adapted to fit around the hand of the user, the band being mounted on the handle so as to press the handle into the palm of the hand without the user having to grasp the handle so as to adjust to fit the hand of the user; and
a communications link coupled to the keyboard and the computer, the communications link enabling transfer of the input data from the keyboard to the computer, wherein the handle has a left-right symmetry and the keys of the chord keyboard are arranged with left-right symmetry on the handle so that the interface can be operated by either hand of the user.

29. A cybernetic interface as recited in claim 28, wherein the chord keyboard further comprises:
   a first keypad mounted on the handle at a location below where the four fingers of the hand of the user curl around the handle to operate by pressing and releasing the keys; and
   a second keypad mounted on the handle at a location below where the thumb of the user is positioned to operate by pressing and releasing the keys.

30. A cybernetic interface as recited in claim 29 wherein said first and second keypads each include a plurality of keys and wherein the handle further comprises:
   a first set of labels for indicating which keys or combination of keys on the first keypad produce a given character; and
   a second set of labels for identifying keys on the second keypad.

31. A cybernetic interface as recited in claim 30 wherein the labels of said first and second sets of labels are embossed on the handle.

32. The cybernetic interface of claim 30 wherein said first and second set of labels comprise templates.

33. A cybernetic interface as recited in claim 28, further comprising a microprocessor for generating the input data for the computer.

34. A cybernetic interface as recited in claim 33, further comprising a look-up table in which character information correlated to the chords generated by the keyboard based on the input data is stored.

35. A cybernetic interface as recited in claim 34, wherein:
   chord keyboard includes a first keypad including an array of individual keys in rows and columns; and
   wherein the look-up table provides an assignment of the characters to the keys and chords on the first keypad in alphabetical order.

36. A cybernetic interface as recited in claim 28, wherein the communications link comprises;
   data transmission means for transmitting the input data generated by the chord keyboard; and
   data receiving means for receiving the input data from the transmission means, the receiving means being adapted for transferring the input data to the computer.

37. A cybernetic interface as recited in claim 28, further comprising means for displaying symbols corresponding to information received by the interface from the computer.

38. A cybernetic interface as recited in claim 28, wherein the handle further comprises a sensor for generating a pointer position information.

39. The cybernetic device of claim 38 wherein said sensor comprises a tilt sensor.

40. The cybernetic device as recited in claim 38 wherein said sensor comprises a plurality of angular accelerometers.

41. A data input device for a computer, comprising:
   a chord keyboard means for generating input data for the computer adapted to be operated by a hand of a user so that input data can be generated by movement of the fingers of the hand; and
   means for supporting the keyboard in the hand of the user when the user operates the keyboard means, the supporting means pressing the keyboard means into the palm of the operating hand of the user,
   wherein the chord keyboard means has a left-right symmetry so that the data input device can be operated by either the right or left hand of the user.

42. A data input device as recited in claim 41, wherein the chord keyboard means further comprises:
   character keys arranged in an array of rows and columns on the chord keyboard means; and
   means for assigning characters to the character keys and chords on the keyboard means in alphabetical order based on the input data generated by the keyboard means.

43. A data input device as recited in claim 42, wherein the chord keyboard means further comprises means for indicating the keys to be pressed to produce a given character.

44. A data input device as recited in claim 41, further comprising sensor means for generating pointer information.

45. The cybernetic device of claim 44 wherein said sensor comprises a tilt sensor.

46. The cybernetic device as recited in claim 44 wherein said sensor comprises a plurality of angular accelerometers.

47. A hand held computer interface device comprising:
   a base;
   a first generally planar wall extending upwardly from said base;
   a contoured surface cooperating with said base and first wall to form a closed three dimensional elongate member in the form of a handle with a circumference;
   a first keyboard disposed on said first wall; and
   a second keyboard on said contoured surface at a point accessible to a thumb of the user,
   wherein the second keyboard is disposed on said contoured surface so as to be accessible by a user's left thumb if the device is held in the left hand and is accessible by a user's right thumb if the device is held in the right hand.

48. The hand held computer interface of claim 47 wherein said circumference is selected so that a human hand can curl about said handle with a finger tip being positioned above said first keyboard.

49. The hand held computer interface device of claim 47 wherein said first keyboard comprises a plurality of keys activated by depression by a finger tip of fingers of a hand operating the device.

50. The hand held computer interface of claim 47 further comprising a support band adapted to fit around the hand of the user, the band being attached to the handle for pressing the handle into the palm of the hand of the user so the handle may be held in the hand and operated by depressing keys on the first keyboard with the tips of the fingers of the hand supporting the device with the band without other means of support.

51. The hand held computer interface device of claim 50 wherein said support band is adjustable in length and in angular position along the contoured surface to custom fit the grip of the device to the hand of the user.

52. The hand held computer interface of claim 51 comprising a microprocessor for generating input data for a computer coupled to the interface device.

53. The hand held computer interface of claim 47 comprising a microprocessor for generating input data for a computer coupled to the interface device.

54. The hand held computer interface device of claim 53 further comprising a sensor coupled to the microprocessor, for generating pointer position information for the computer.

55. The cybernetic interface as recited in claim 54 wherein said sensor comprises a plurality of angular accelerometers.

56. The cybernetic device as recited in claim 54 wherein said sensor comprises a tilt sensor.

57. A hand held computer interface unit comprising:
an elongated handle having a first and a second face, and a contoured body supporting said first and second faces, the contours of the body being adapted to fit in the operating hand of a user; and
a first and second keyboard, for the fingers and thumb respectively, positioned on the first and second faces, wherein the fingers and thumb of the operating hand curl around the contoured body to position the tips of the fingers and thumb of the operating hand above said first and second keyboards; and
a plurality of keys disposed on said first and second keyboards, said plurality of keys adapted to be activated when depressed by the tips of said fingers and thumb, and said keys generating input and control information when depressed and released wherein said fingers and thumb are above said first and second keyboard when not operating the keys of the respective keyboards,
wherein the second keyboard is disposed on said contoured surface so as to be accessible by a user's left thumb if the device is held in the left hand and is accessible by a user's right thumb if the device is held in the right hand.

58. The hand held computer interface of claim 57 further comprising a support band adapted to fit around the hand of the user, the band being attached to the handle for pressing the handle into the palm of the hand of the user so the handle may be held in the hand and operated by depressing keys on the keyboard with the tips of the fingers of the hand supporting the device with the band without other means of support.

59. The hand held computer interface device of claim 58 wherein said support band is adjustable in length and in angular position along the contoured surface to custom fit the grip of the device to the hand of the user.

60. The hand held computer interface device of claim 59 comprising a microprocessor for generating input data for a computer coupled to the interface device.

61. The hand held computer interface device of claim 57 comprising a microprocessor for generating input data for a computer coupled to the interface device.

62. The hand held computer interface device of claim 61 further comprising a sensor coupled to the microprocessor, for generating pointer position information for the computer.

63. The cybernetic device as recited in claim 62 wherein said sensor comprises a plurality of angular accelerometers.

64. A hand held computer interface unit comprising:
an elongated handle having a first face, and a contoured body supporting said first face, the contours of the body being adapted to fit in the operating hand of a user; and,
a first keyboard positioned on said first face, wherein the fingers of the operating hand curl around the contoured body to position the tips of the fingers of the operating hand over a plurality of keys disposed on said first keyboard, said plurality of keys generating input and control information when depressed and released and wherein the design of said handle is such that is it maintained in position in the hand while the tips of the fingers of the operating hand are positioned above but not in contact with the keys disposed on said first keyboard; and
a second keyboard positioned on a second surface of said handle and having a plurality of keys which can be manipulated by the thumb of the operating hand, wherein the keys of said second keyboard are adapted to be activated when depressed and released by the thumb of the operating hand,
wherein the second keyboard is disposed on said contoured surface so as to be accessible by a user's left thumb if the device is held in the left hand and is accessible by a user's right thumb if the device is held in the right hand.

65. The hand held computer interface of claim 64 further comprising a support band adapted to fit around the hand of the user, the band being attached to the handle for pressing the handle into the palm of the hand of the user so the handle may be held in the hand and operated by depressing keys on the keyboard with the tips of the fingers of the hand supporting the device with the band without other means of support.

66. The hand held computer interface device of claim 65 wherein said support band is adjustable in length and in angular position along the contoured surface to custom fit the grip of the device to the hand of the user.

67. The hand held computer interface device of claim 66 comprising a microprocessor for generating input data for a computer coupled to the interface device.

68. The hand held computer interface device of claim 64 comprising a microprocessor for generating input data for a computer coupled to the interface device.

69. The hand held computer interface device of claim 68 further comprising a sensor coupled to the microprocessor, for generating pointer position information for the computer.

70. The cybernetic device as recited in claim 69 wherein said sensor comprises a plurality of angular accelerometers.

71. The cybernetic device as recited in claim 69 wherein said sensor comprises a tilt sensor.

* * * * *